(12) United States Patent
Miyazaki et al.

(10) Patent No.: US 9,344,604 B2
(45) Date of Patent: May 17, 2016

(54) DISPLAY PROCESSING APPARATUS CORRECTING COLOR SATURATION DUE TO GLOSS, IMAGE FORMING SYSTEM, AND COMPUTER PROGRAM PRODUCT

(75) Inventors: Ryonosuke Miyazaki, Tokyo (JP); Hiroaki Suzuki, Chiba (JP)

(73) Assignee: RICOH COMPANY, LIMITED, Tokyo (JP)

( * ) Notice: Subject to any disclaimer, the term of this patent is extended or adjusted under 35 U.S.C. 154(b) by 381 days.

(21) Appl. No.: 13/610,572

(22) Filed: Sep. 11, 2012

(65) Prior Publication Data

US 2013/0063741 A1   Mar. 14, 2013

(30) Foreign Application Priority Data

Sep. 14, 2011   (JP) .................................. 2011-200748
Aug. 24, 2012   (JP) .................................. 2012-185635

(51) Int. Cl.
*H04N 1/54*   (2006.01)
*H04N 1/60*   (2006.01)

(52) U.S. Cl.
CPC ............... *H04N 1/54* (2013.01); *H04N 1/6011* (2013.01)

(58) Field of Classification Search
CPC ............... G03G 15/6585; G03G 2215/00805; G03G 15/01; G03G 15/5025; G03G 2215/0081; G09G 5/02; H04N 1/60; H04N 1/6011; H04N 1/00456
USPC .......... 358/1.9, 2.1, 3.23, 3.27, 501, 518, 538, 358/540; 382/164, 167, 274; 715/274, 768
See application file for complete search history.

(56) References Cited

U.S. PATENT DOCUMENTS

| | | | | |
|---|---|---|---|---|
| 5,966,222 A | * | 10/1999 | Hirata et al. | 358/520 |
| 2005/0243341 A1 | * | 11/2005 | Ng | 358/1.9 |
| 2008/0193860 A1 | * | 8/2008 | Hains | 430/5 |
| 2010/0196035 A1 | * | 8/2010 | Takemura | 399/67 |
| 2012/0062956 A1 | | 3/2012 | Kitagawa et al. | |
| 2012/0063802 A1 | | 3/2012 | Suzuki et al. | |
| 2013/0022753 A1 | * | 1/2013 | Qiao | G03G 15/6585 427/469 |

FOREIGN PATENT DOCUMENTS

JP   2008-145784   6/2008
JP   2010-175968   8/2010

* cited by examiner

*Primary Examiner* — Jamares Q Washington
(74) *Attorney, Agent, or Firm* — Harness, Dickey & Pierce, PLC

(57) ABSTRACT

A display processing apparatus includes a first correcting unit that, based on original data containing first-type color image data that indicates a color image in each drawing area and containing first-type gloss control image data that indicates a type of gloss effect to be given to a recording medium and indicates a gloss area to which the gloss effect is to be given in each drawing area, corrects color saturation of an area in the first-type color image data that corresponds to the gloss area specified by the first-type gloss control image data depending on the type of gloss effect, to thereby generate first-type corrected image data; and a display control unit that, on a display unit, displays the first-type corrected image data as a print preview of a projected printing result of the original data.

13 Claims, 31 Drawing Sheets

FIRST-TYPE COLOR IMAGE DATA

| TYPE OF GLOSS EFFECT | GLOSS | DEVIATION |
|---|---|---|
| ULTRAHIGH GLOSS | $Gs \geq 80$ | $\Delta Gs \leq 10$ |
| HIGH GLOSS | $Gs = Gs$ (BETA GLOSS) | $\Delta Gs \leq 10$ |
| LOW GLOSS | $Gs = Gs$ (1C 30% HALFTONE DOT) | $\Delta Gs \leq 10$ |
| MATTE | $Gs \leq 10$ | $\Delta Gs \leq 10$ |

FIRST-TYPE GLOSS
CONTROL IMAGE DATA

▨ :AREA SPECIFIED TO HAVE ULTRAHIGH
GLOSS (COLOR DENSITY VALUE 98%)

▨ :AREA SPECIFIED TO HAVE HIGH GLOSS
(COLOR DENSITY VALUE 90%)

☰ :AREA SPECIFIED TO HAVE LOW GLOSS
(COLOR DENSITY VALUE 16%)

FIRST-TYPE CLEAR
IMAGE DATA

FIG.10

| COLOR DENSITY VALUE (%) | COLOR DENSITY VALUE | TYPE OF SURFACE EFFECT |
|---|---|---|
| 94% TO 98% | "205" TO "255" | ULTRAHIGH GLOSS |
| 84% TO 90% | "154" TO "204" | HIGH GLOSS |
| 10% TO 16% | "52" TO "102" | LOW GLOSS |
| 0% TO 6% | "1" TO "51" | MATTE |

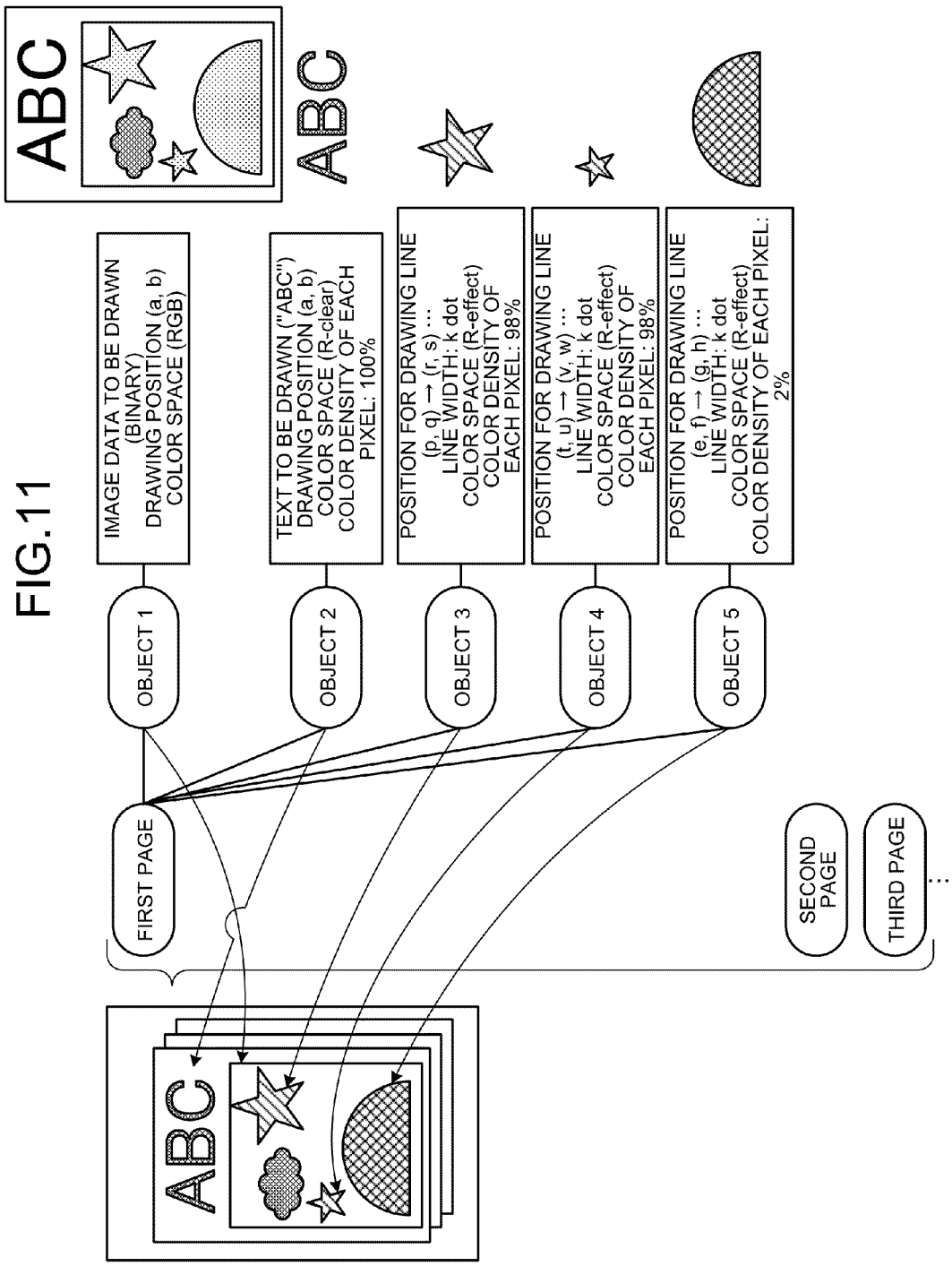

FIG.12A

| COLOR DENSITY VALUES IN TRANSPARENT IMAGE | AUTOMATIC COLOR ADJUSTMENT VALUES |
|---|---|
| 205 TO 255 | +0.3 |
| 154 TO 204 | +0.15 |
| 103 TO 153 | ±0 |
| 52 TO 102 | -0.15 |
| 1 TO 51 | -0.3 |

FIG.12B

| TYPE OF GLOSS EFFECT | COLOR DENSITY VALUES | AUTOMATIC COLOR ADJUSTMENT VALUES |
|---|---|---|
| ULTRAHIGH GLOSS | 205 TO 255 | +0.3 |
| HIGH GLOSS | 154 TO 204 | +0.15 |
| NO CHANGE | 103 TO 153 | ±0 |
| LOW GLOSS | 52 TO 102 | -0.15 |
| MATTE | 1 TO 51 | -0.3 |

FIG.15A

| EXPRESSIONS ON SLIDE BAR | COLOR SATURATION ADJUSTMENT VALUES |
|---|---|
| ULTRAHIGH GLOSS | +0.3 |
| HIGH GLOSS | +0.15 |
| NO CHANGE | ±0 |
| LOW GLOSS | -0.15 |
| MATTE | -0.3 |

FIG.15B

| COLOR DENSITY VALUES IN TRANSPARENT IMAGE | AUTOMATIC COLOR ADJUSTMENT VALUES | MANUAL COLOR ADJUSTMENT VALUES |
|---|---|---|
| 205 TO 255 | +0.3 | +0.3 |
| 154 TO 204 | +0.15 | +0.15 |
| 103 TO 153 | ±0 | ±0 |
| 52 TO 102 | -0.15 | -0.15 |
| 1 TO 51 | -0.3 | -0.3 |

FIG.17

| GLOSS EFFECT NAMES | R-effect COLOR DENSITY VALUES |
|---|---|
| ULTRAHIGH GLOSS | 205 TO 255 |
| HIGH GLOSS | 154 TO 204 |
| NO CHANGE | 103 TO 153 |
| LOW GLOSS | 52 TO 102 |
| MATTE | 1 TO 51 |

FIG.18

| TYPE OF GLOSS EFFECT | COLOR DENSITY VALUE | ADJUSTMENT METHODS | AUTOMATIC COLOR ADJUSTMENT VALUES | MANUAL COLOR ADJUSTMENT VALUES |
|---|---|---|---|---|
| ULTRAHIGH GLOSS | 205 TO 255 | MANUAL | +0.3 | +0.225 |
| HIGH GLOSS | 154 TO 204 | AUTOMATIC | +0.15 | +0.15 |
| NO CHANGE | 103 TO 153 | – | ±0 | ±0 |
| LOW GLOSS | 52 TO 102 | AUTOMATIC | -0.15 | -0.15 |
| MATTE | 1 TO 51 | AUTOMATIC | -0.3 | -0.3 |

FIG.20

| TYPE OF GLOSS EFFECT | TARGET SETTING | COLOR DENSITY VALUE | ADJUSTMENT METHODS | AUTOMATIC COLOR ADJUSTMENT VALUES | MANUAL COLOR ADJUSTMENT VALUES |
|---|---|---|---|---|---|
| ULTRAHIGH GLOSS | NON-TARGET | 205 TO 255 | MANUAL | +0.3 | 0.3 |
| HIGH GLOSS | TARGET | 154 TO 204 | AUTOMATIC | +0.15 | 0.3 |
| NO CHANGE | NON-TARGET | 103 TO 153 | – | ±0 | 0.3 |
| LOW GLOSS | NON-TARGET | 52 TO 102 | AUTOMATIC | -0.15 | 0.3 |
| MATTE | NON-TARGET | 1 TO 51 | AUTOMATIC | -0.3 | 0.3 |

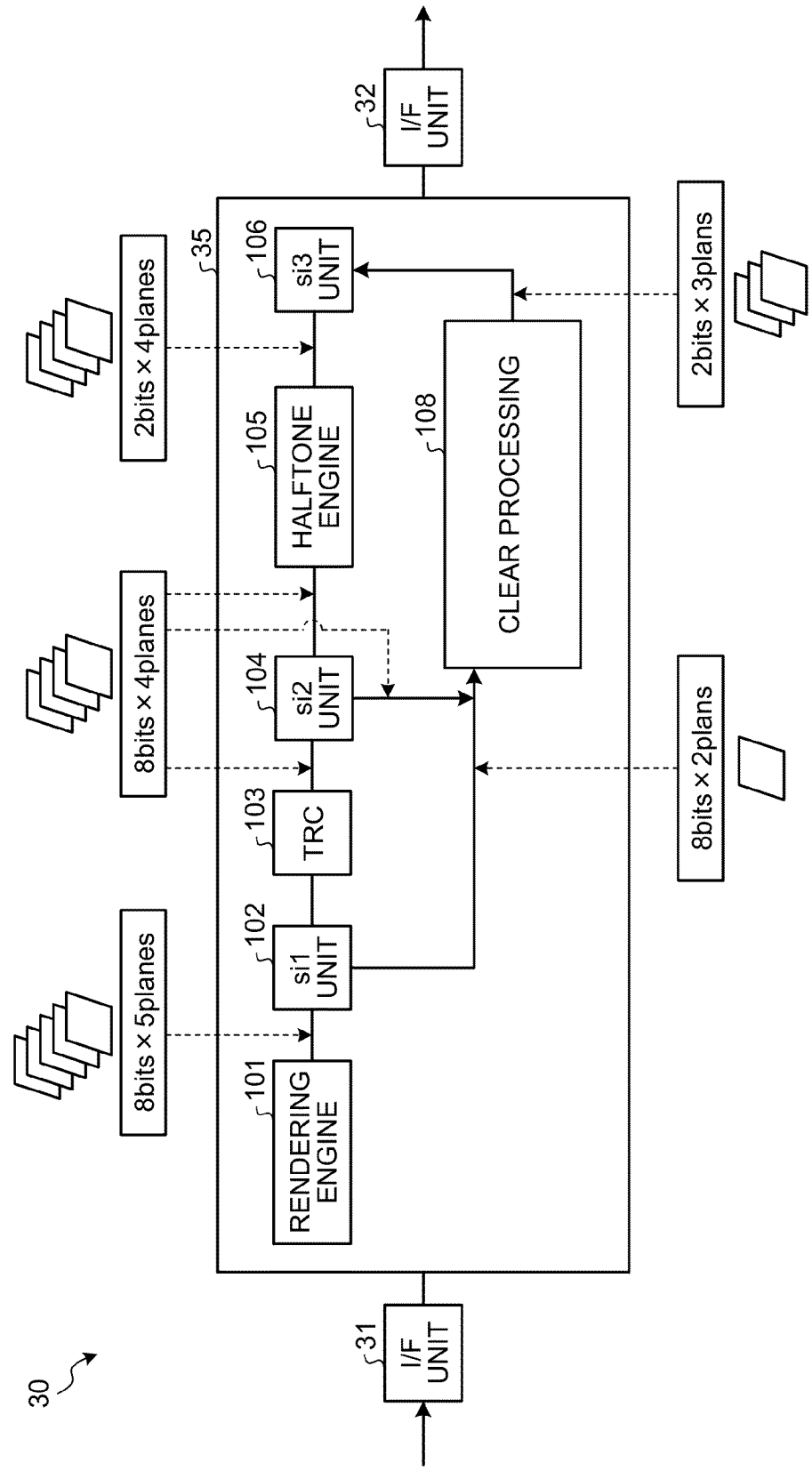

FIG.27

| COLOR DENSITY VALUES (%) | COLOR DENSITY VALUES | TYPES OF GLOSS EFFECT | ON/OFF INFORMATION | Clr-1 | Clr-2 | Clr-3 | TYPES OF IMPLEMENTABLE GLOSS EFFECT |
|---|---|---|---|---|---|---|---|
| 94% TO 98% | "205" TO "255" | ULTRAHIGH GLOSS | ON | INVERSE MASK 1 | NO DATA | NO DATA | ULTRAHIGH GLOSS |
| 84% TO 90% | "154" TO "204" | HIGH GLOSS | ON | INVERSE MASK m | SOLID | NO DATA | HIGH GLOSS |
| 10% TO 16% | "52" TO "102" | LOW GLOSS | ON | NO DATA | HALFTONE-N | NO DATA | LOW GLOSS |
| 0% TO 6% | "1" TO "51" | MATTE | ON | NO DATA | NO DATA | SOLID | MATTE |

DISPLAY PROCESSING APPARATUS CORRECTING COLOR SATURATION DUE TO GLOSS, IMAGE FORMING SYSTEM, AND COMPUTER PROGRAM PRODUCT

CROSS-REFERENCE TO RELATED APPLICATIONS

The present application claims priority to and incorporates by reference the entire contents of Japanese Patent Application No. 2011-200748 filed in Japan on Sep. 14, 2011 and Japanese Patent Application No. 2012-185635 filed in Japan on Aug. 24, 2012.

BACKGROUND OF THE INVENTION

1. Field of the Invention

The present invention relates to a display processing apparatus, an image forming system, and a computer program product.

2. Description of the Related Art

Typically, in some image forming apparatuses, images are printed using not only the toners of four colors of cyan, magenta, yellow, and black (CMYK) but also a transparent developer. With the use of a transparent developer, a visual effect or a haptic effect (called a gloss effect) can be given to the surface of a recording medium. Moreover, by forming images with the use of a transparent developer, it becomes possible to form transparent images that are useful in preventing falsification or forgery. Regarding such image forming apparatuses, a technique is known in which, prior to performing printing, the projected printing result is displayed in the form of an image. That is, a technique is known for displaying a print preview. For example, Japanese Patent Application Laid-open No. 2008-145784 discloses a technique for displaying a print preview of the image portion that would get printed with the use of a transparent toner.

However, in the technique disclosed in Japanese Patent Application Laid-open No. 2008-145784, the image to be printed with a transparent toner is colored using a predetermined color (hereinafter, the colored image). Then, the print preview is displayed by superimposing the colored image on a color image that has been formed using the CMYK toners. As a result, in the display image that is displayed as the print preview, the colors or designs of the colored image that fall within the overlapping area with the color image get hidden behind the color image.

Therefore, there is a need for a display processing apparatus, an image forming system, and a computer program product that are capable of displaying a print preview in which the area formed using a transparent developer is displayed without resulting in hiding of the color image.

SUMMARY OF THE INVENTION

According to an embodiment, there is provided a display processing apparatus that includes a first correcting unit that, based on original data containing first-type color image data that indicates a color image in each drawing area and containing first-type gloss control image data that indicates a type of gloss effect to be given to a recording medium and indicates a gloss area to which the gloss effect is to be given in each drawing area, corrects color saturation of an area in the first-type color image data that corresponds to the gloss area specified by the first-type gloss control image data depending on the type of gloss effect, to thereby generate first-type corrected image data; and a display control unit that, on a display unit, displays the first-type corrected image data as a print preview of a projected printing result of the original data.

According to another embodiment, there is provided an image forming system that includes a printing unit that prints an image on a recording medium based on original data; and a display processing apparatus that, on a display unit, displays a display image as a print preview of a projected printing result of the printing unit. The display processing apparatus includes a first correcting unit that, based on original data containing first-type color image data that indicates a color image in each drawing area and containing first-type gloss control image data that indicates a type of gloss effect to be given to a recording medium and indicates a gloss area to which the gloss effect is to be given in each drawing area, corrects color saturation of an area in the first-type color image data that corresponds to the gloss area indicated by the first-type gloss control image data depending on the type of gloss effect, to thereby generate first-type corrected image data; and a display control unit that, on the display unit, displays the first-type corrected image data as a print preview of the projected printing result of the original data.

According to still another embodiment, there is provided a computer program product including a non-transitory computer-readable medium including programmed instructions. The instructions cause a computer to execute correcting, based on original data containing first-type color image data that indicates a color image in each drawing area and containing first-type gloss control image data that indicates a type of gloss effect to be given to a recording medium and indicates a gloss area to which the gloss effect is to be given in each drawing area, color saturation of an area in the first-type color image data that corresponds to the gloss area indicated by the first-type gloss control image data depending on the type of gloss effect, to thereby generate first-type corrected image data; and displaying, on a display unit, the first-type corrected image data as a print preview of a projected printing result of the original data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a diagram illustrating an example of a color-density-value selection table;

FIG. 11 is a schematic diagram illustrating an exemplary structure of original data;

FIG. 12A is a diagram illustrating an example of a first table;

FIG. 12B is a diagram illustrating an example of a second table;

FIG. 14A is a diagram illustrating an example of the input screen when the color representing method is "automatic" and FIG. 14B is a diagram illustrating an example of the input screen when the color representing method is "manual";

FIGS. 15A and 15B are diagrams illustrating tables used in the first embodiment, where FIG. 15A is a diagram illustrating a third table and FIG. 15B is a diagram illustrating a transparent image managing table;

FIG. 16A is a diagram illustrating an example of the input screen when the color representing method is "automatic" and FIG. 16B is a diagram illustrating an example of the input screen when the color representing method is "manual";

FIG. 17 is an exemplary table in which color density values for gloss control are stored in a corresponding manner to gloss effect names;

FIG. 18 is a diagram illustrating an example of a gloss control managing table;

FIG. 19A is a diagram illustrating an example of the input screen when the color representing method is "automatic" and FIG. 19B is a diagram illustrating an example of the input screen when the color representing method is "manual";

FIG. 20 is a diagram illustrating an example of a gloss highlighting managing table;

FIG. 26 is a block diagram illustrating a configuration example of a digital front end (DFE) according to the first embodiment;

FIG. 27 is a diagram illustrating types of gloss effect related to the presence and absence of gloss;

DETAILED DESCRIPTION OF THE PREFERRED EMBODIMENTS

First Embodiment

Exemplary embodiments are described in detail below with reference to the accompanying drawings.

Figure 1:
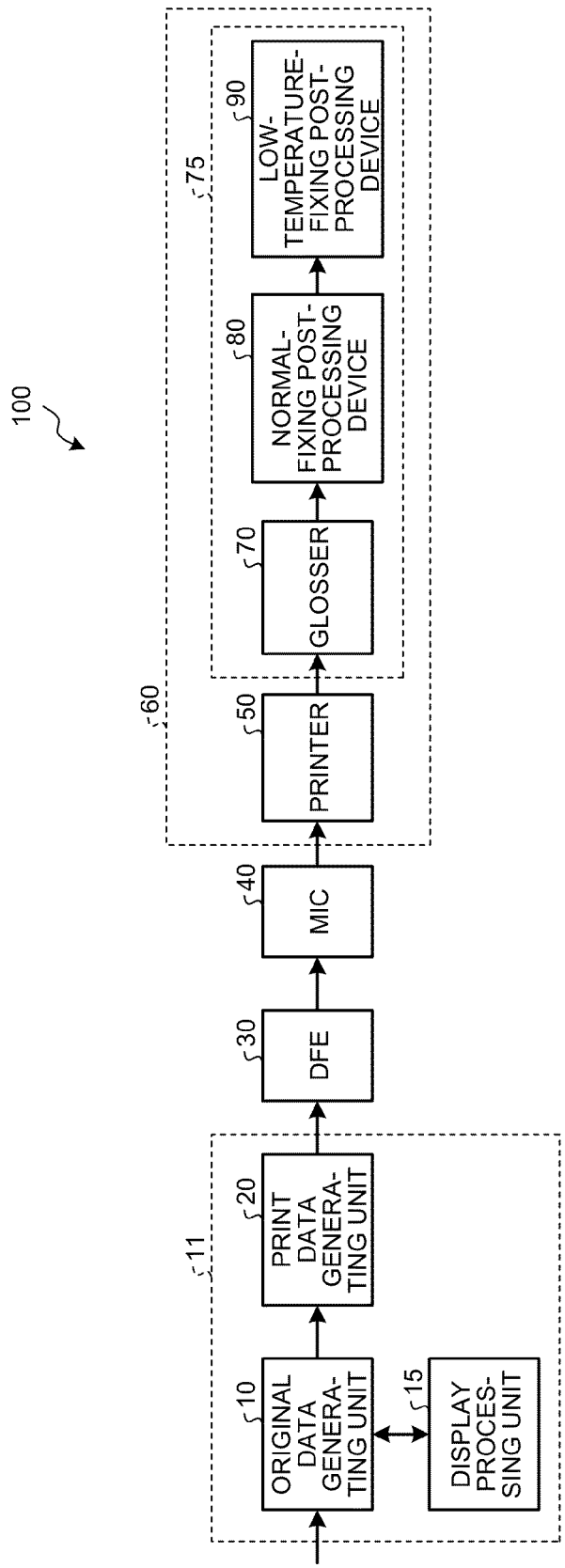
FIG. 1 is a block diagram illustrating an overall configuration of an image forming system according to a first embodiment.

FIG. 1 is a block diagram illustrating an overall configuration of an image forming system 100 according to a first embodiment. As illustrated in FIG. 1, the image forming system 100 includes a host device 11, a printer control device (DFE: Digital Front End) (hereinafter, referred to as "DFE") 30, an interface controller (MIC: Mechanism I/F controller) (hereinafter, sometimes referred to as "MIC") 40, and a printing device 60. The host device 11, the DFE 30, the MIC 40, and the printing device 60 are interconnected via a wired communication line or a wireless communication line so as to enable communication of data with each other.

The host device 11 is configured with, for example, a personal computer (PC) or the like; and includes functional components such as an original data generating unit 10, a print data generating unit 20, and a display processing unit 15. In the first embodiment, although the host device 11 includes the functional components such as the original data generating unit 10, the print data generating unit 20, and the display processing unit 15; it is also possible to have a separate configuration (such as a separate personal computer) in which the original data generating unit 10, the print data generating unit 20, and the display processing unit 15 are disposed. Still alternatively, the original data generating unit 10, the print data generating unit 20, and the display processing unit 15 need not be disposed in an integrated manner in a single device.

Meanwhile, the host device 11 can be connected to a communication line such as the Internet, and can be connected to the DFE 30 via that communication line so as to communicate data with the DFE 30.

Figure 2:
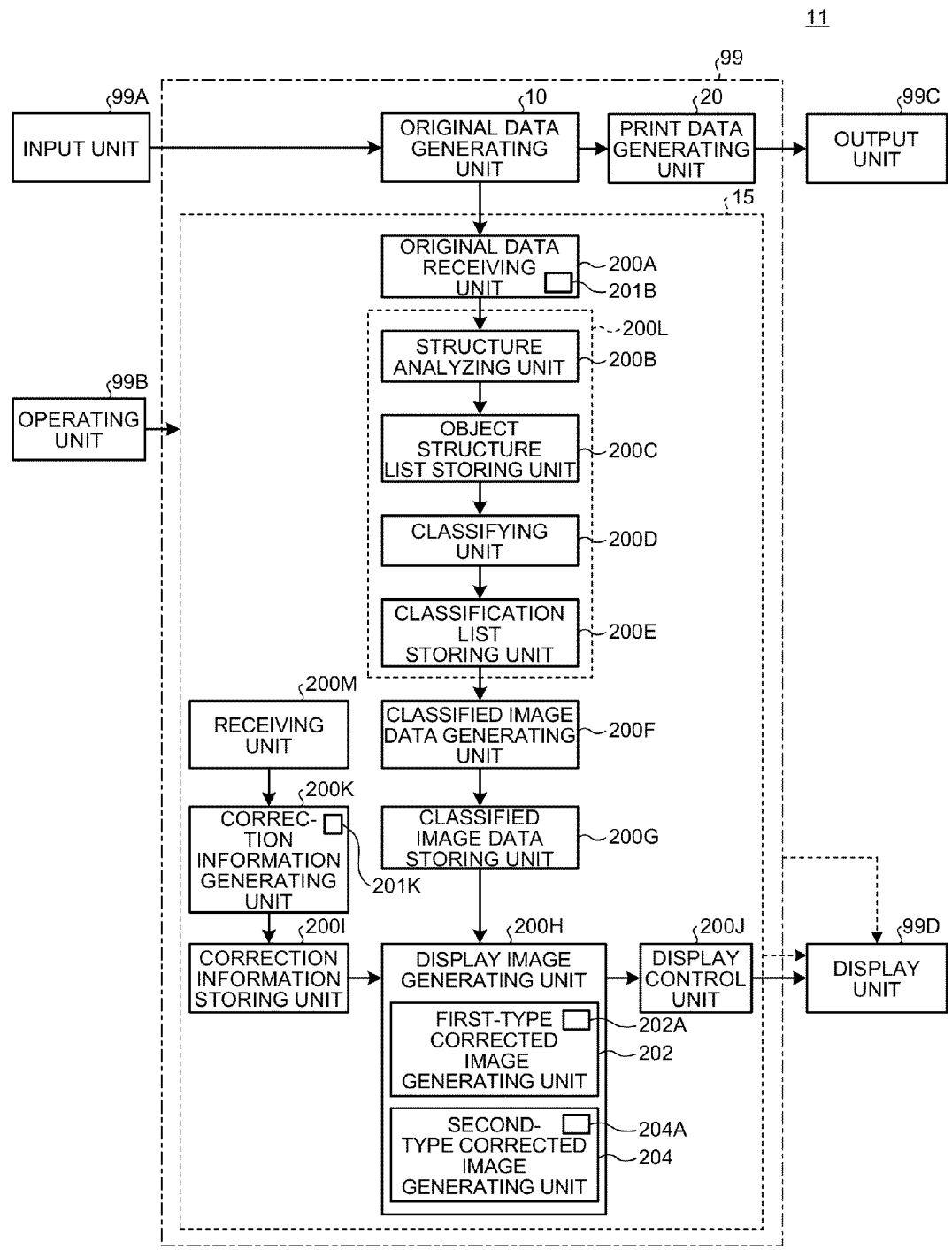
FIG. 2 is a functional block diagram of a host device according to the first embodiment.

FIG. 2 illustrates an example of a specific configuration of the host device 11.

As illustrated in FIG. 2, the host device 11 includes an input unit 99A, an operating unit 99B, an output unit 99C, a display unit 99D, and a control unit 99.

The input unit 99A receives first-type color image data (described later) from an external device such as a personal computer. The operating unit 99B can be a button, or a remote control receiving unit, or a card reader that reads information from an IC card. Meanwhile, the operating unit 99B can also be configured to include a keyboard.

The output unit 99C is an interface device used to perform communication with the DFE 30. The display unit 99D is a display device that displays a variety of information. As the display unit 99D, a known device is used.

The control unit 99 controls the host device 11 in entirety, and is a computer including a central processing unit (CPU), a read only memory (ROM), and a random access memory (RAM).

In the first embodiment, as illustrated in FIG. 2, the host device 11 serves as a functional component of the control unit 99; and includes the original data generating unit 10, the print data generating unit 20, and the display processing unit 15. These functional components as well as the functions thereof are implemented when the CPU of the control unit 99 loads various programs, which are stored in the ROM, in the RAM. Meanwhile, at least some of these functions can be implemented with the use of a different circuit (hardware).

The original data generating unit 10 receives the first-type color image data (described later) and generates original data by appending, to the first-type color image data, special color image data (first-type gloss control image data (described later) and first-type clear image data (described later)) that indicates gloss areas to which a gloss effect is to be given and the types of gloss effect as well as indicates a transparent image and the area on which the transparent image is formed. Then, the original data generating unit 10 outputs the original data to the print data generating unit 20 and to the display processing unit 15. Meanwhile, the original data generating unit 10 can generate the first-type color image data, too.

The print data generating unit 20 generates print data (details given later) based on the original data. The display processing unit 15 generates a print preview (details given later), which is an image of the projected printing result, based on the original data.

Herein, the original data specifically points to image data that contains the first-type color image data, the first-type gloss control image data, and the first-type clear image data.

Each of the first-type color image data, the first-type gloss control image data, and the first-type clear image data is generated, for example, in the units of pages in the PDF format (PDF stands for Portable Document Format). The original data is generated by integrating the first-type color image data, the first-type gloss control image data, and the first-type clear image data. Meanwhile, the format of the first-type color image data, the first-type gloss control image data, and the first-type clear image data is not limited to the PDF format. Rather, it is possible to use any other format.

In the first-type color image data, the first-type gloss control image data, and the first-type clear image data; each drawing area (described later) that is specified by the above-mentioned sets of image data is expressed in, for example, the vector format.

More specifically, the first-type color image data is the image data that, for each drawing area, indicates a color image to be printed with the use of a color developer.

Figures 3, 4:
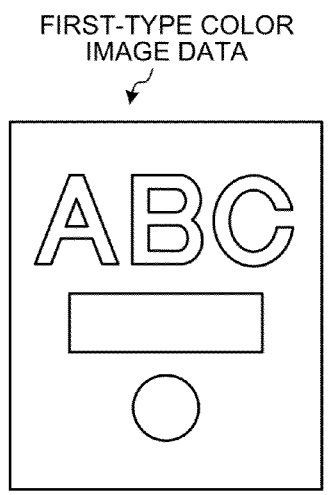
FIG. 3 is an explanatory diagram illustrating an example of first-type color image data.
FIG. 4 is a diagram illustrating types of surface effect.

More particularly, the first-type color image data is the image data in which, for each drawing area, the color density values are defined for the colors of RGB or the colors of CMYK. FIG. 3 is an explanatory diagram illustrating an example of the first-type color image data. In FIG. 3, for each of the drawing areas "A", "B", and "C"; a color density value corresponding to a user-specified color is assigned. The color density value for each drawing area is expressed in the range of color density values from 0% to 100% (or can be expressed in the range from 0 to 255).

A color developer can be a liquid or a toner that contains color materials of CMYK or the like. In the first embodiment, for example, as the color developer, a color toner is used that contains the color material of each color of CMYK.

The first-type gloss control image data is the image data that, for each drawing area, indicates the types of gloss effect as well as the gloss areas to which a gloss effect is to be given. Herein, a gloss effect points to a visual effect or a haptic effect that is given to the recording medium. A gloss area is obtained by applying a transparent developer to the recording medium.

The transparent developer points to a colorless and transparent developer not containing any color material. Herein, transparent and colorless indicate that the transmittance of visible light is equal to or more than 70%. In the first embodiment, the explanation is given for a case in which a transparent toner (hereinafter, referred to as "clear toner") is used as the transparent developer.

Thus, the clear toner is a transparent toner not containing any color material. Herein too, transparent and colorless indicate that the transmittance of visible light is equal to or more than 70%.

The gloss effect is broadly divided into four types as illustrated in FIG. 4. In descending order of the degree of glossiness (gloss level), the gloss effect is broadly divided into "ultrahigh gloss", "high gloss", "low gloss", and "matte". However, it is also possible to divide the gloss effect into a greater number of types.

In the first-type gloss control image data, the color density value of each gloss area is expressed in the range of color density values from 0% to 100% (or can be expressed in the range from "0" to "255") in an identical manner to the first-type color image data. The color density values are associated with the types of gloss effect. In FIG. 4, it is illustrated that the gloss effect "ultrahigh gloss" has a gloss level Gs to be equal to or more than 80; the gloss effect "high gloss" has the gloss level Gs to be equal to the solid gloss level formed by a primary color or a secondary color; the gloss effect "low gloss" has a primary color and has a gloss level of 30% halftone dot; and the gloss effect "matte" has a gloss level of equal to or smaller than 10. Herein, the deviation in a gloss level is expressed as ΔGs and is set to be equal to or smaller than 10. Regarding these types of gloss effect; the gloss effect that gives a high degree of gloss level is associated with a high color density value, and the gloss effect that holds down the gloss level is associated with a low color density value.

Meanwhile, it is the user who specifies a particular area in a color image to which a gloss effect is to given and specifies the type of gloss effect to be given to that particular area. Regarding each drawing area specified by the user, the original data generating unit 10 of the host device 11 sets a color density value corresponding to the user-specified gloss effect to thereby generate the first-type gloss control image data. Meanwhile, the explanation regarding the correspondence relationship between the color density values and the types of gloss effect is given later.

Figure 5:
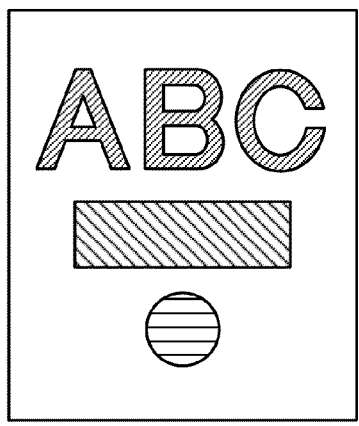
FIG. 5 is an explanatory diagram illustrating an example of first-type gloss control image data.

FIG. 5 is an explanatory diagram illustrating an example of the first-type gloss control image data. The example of the first-type gloss control image data illustrated in FIG. 5 is given for a case when the user specifies the gloss effect "ultrahigh gloss" for a drawing area "ABC", specifies the gloss effect "high gloss" to a drawing area "(oblong drawing)", and specifies the gloss effect "low gloss" to a drawing area "(circular drawing)". Herein, the color density value set for each gloss effect is held in a color-density-value selection table (described later) in a corresponding manner to that gloss effect.

The first-type clear image data is the image data that, for each drawing area, indicates a transparent image to be printed with the use of a clear toner (transparent developer). Herein, a transparent image points to a drawing area that is formed with the use of a clear toner in an area that is outside of the gloss areas which have gloss effects given to them. The examples of a transparent image include a watermark.

Figure 6:
FIG. 6 is an explanatory diagram illustrating an example of first-type clear image data.

FIG. 6 is an explanatory diagram illustrating an example of the first-type clear image data. In the example illustrated in FIG. 6, a watermark "Sale" is specified to be a transparent image.

In this way, in the original data generating unit 10 of the host device 11; the first-type clear image data and the first-type gloss control image data are generated in a different piece of image data (a different plane) than the first-type color image data.

Figure 7:
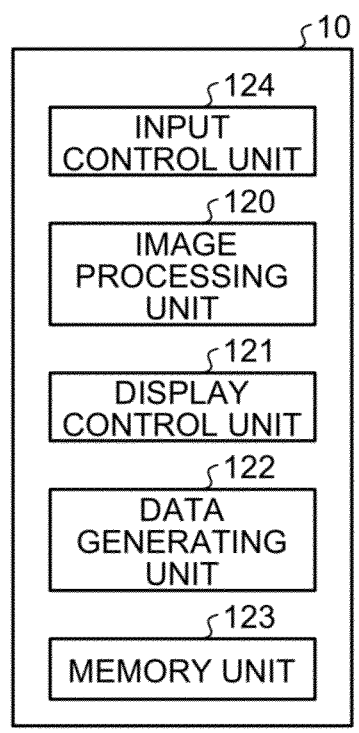
FIG. 7 is a functional block diagram of an original data generating unit according to the first embodiment.

FIG. 7 is a functional block diagram of the original data generating unit 10.

The original data generating unit 10 mainly includes an input control unit 124, an image processing unit 120, a display control unit 121, a data generating unit 122, and a memory unit 123.

The input control unit 124 receives a variety of input performed via the input unit 99A (see FIG. 2) and performs input control. For example, the user can operate the input unit 99A and input image specification information for specifying an image, from among various images (such as photographs, characters, drawings, or composite images), to which gloss effects are to be given. That is, the user can operate the input unit 99A and input image specification information for specifying the first-type color image data (hereinafter, sometimes referred to as "target image"). Meanwhile, the method of inputting the image specification information is not limited to the abovementioned explanation.

The display control unit controls the display unit 99D for displaying a variety of information (see FIG. 2). In the first embodiment, when the image specification information is received by the input control unit 124; the display control unit 121 reads, from the memory unit 123, the image that is specified in the image specification information and controls the display unit 99D so that the read image is displayed on a screen.

In order to input specification information for specifying gloss areas to which a gloss effect is to be given and specifying the types of gloss effect, the user can operate the input unit 99A while checking the target image. However, the method of inputting specification information is not limited to the abovementioned explanation.

Figure 8:
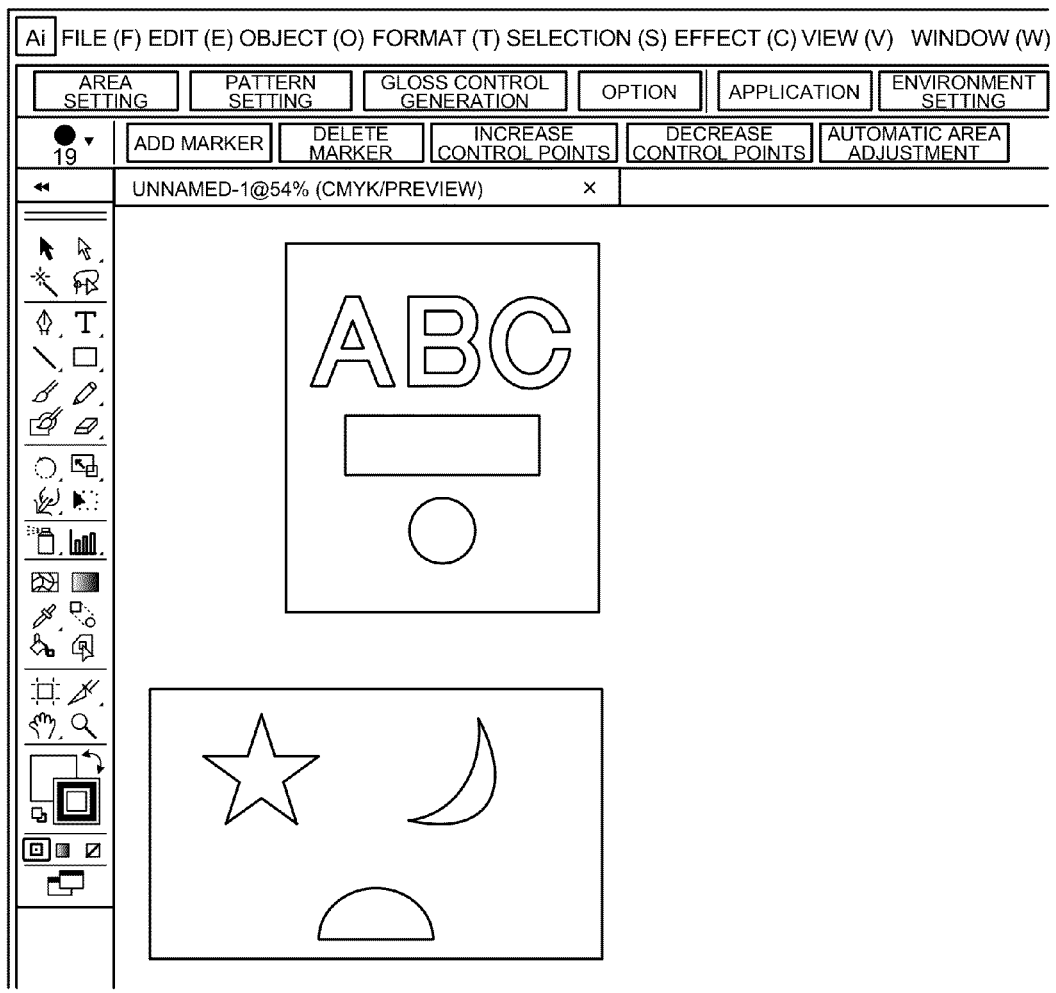
FIG. 8 is a diagram illustrating an example of a screen that is displayed.
Figure 9:
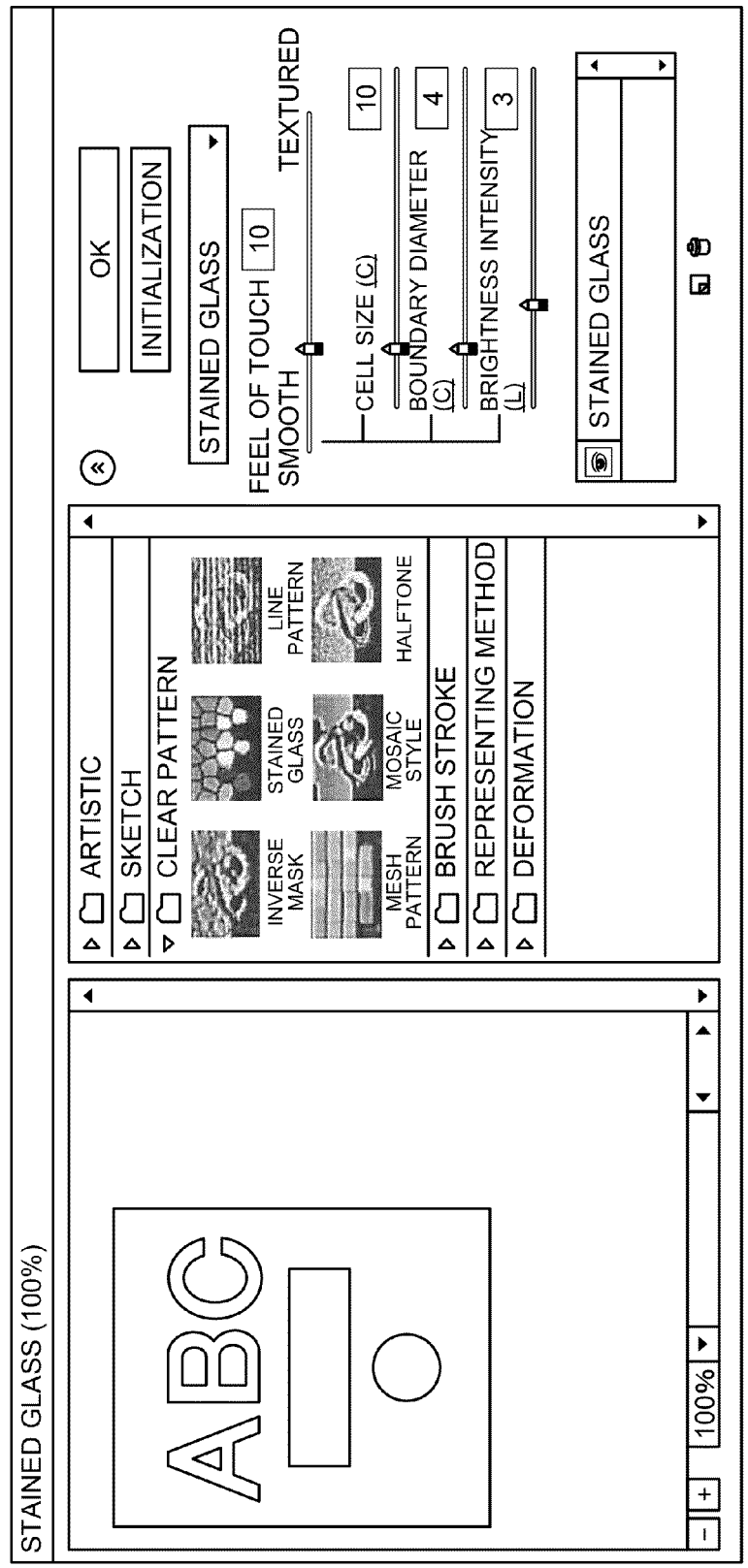
FIG. 9 is a diagram illustrating an example of a screen that is displayed.

More particularly, the display control unit 121 instructs the display unit 99D to display, for example, a screen illustrated in FIG. 8. Herein, FIG. 8 illustrates an exemplary screen on which a plug-in is incorporated in Adobe Illustrator distributed by the Adobe Systems®. In the screen illustrated in FIG. 8, images formed with target image data for processing (i.e., the first-type color image data) are displayed. When the user presses an "add marker" button via the input unit 99A and performs input for specifying a gloss area to which a gloss effect is to be given, the gloss area to which a gloss effect is to be given gets specified. The user performs such input operation for each gloss area to which a gloss effect is to be given. Then, for example, for each specified gloss area (drawing area), the display control unit 121 instructs the display unit 99D to display a screen illustrated in FIG. 9. Herein, in the screen illustrated in FIG. 9, an image is displayed that indicates the drawing area of each gloss area that is specified as the area to which a gloss effect is to be given. When an input is performed via the input unit 99A to specify the type of gloss effect to be given to that image (drawing area); the type of gloss effect to be given to that drawing area gets specified.

Returning to the explanation with reference to FIG. 7, the image processing unit 120 performs a variety of image processing with respect to the target image according to the instructions input by the user via the input unit 99A (see FIG. 2).

When the input control unit 124 receives specification information (about the gloss areas to which a gloss effect is to be given and about the types of gloss effect), the data generating unit 122 generates the first-type gloss control image data according to the specification information. Moreover, when the input control unit 124 receives specification of a transparent image, the data generating unit 122 generates the first-type clear image data according to the user specification.

The memory unit 123 is used to store a color-density-value selection table in which the types of gloss effect and the color density values corresponding to those types of gloss effect are stored. FIG. 10 is a diagram illustrating an example of the color-density-value selection table. In the example illustrated in FIG. 10, color density values in the range from 94% to 98% correspond to the gloss effect "ultrahigh gloss"; color density values in the range from 84% to 90% correspond to the gloss effect "high gloss"; color density values in the range from 10% to 16% correspond to the gloss effect "low gloss"; and color density values in the range from 0% to 6% correspond to the gloss effect "matte". Meanwhile, it is also possible to divide the gloss effect into a greater number of types.

Returning to the explanation with reference to FIG. 7, the data generating unit 122 refers to the color-density-value selection table illustrated in FIG. 10 and sets the color density value of the drawing area for which the user has specified a predetermined gloss effect to a value corresponding to the type of that specified gloss effect, to thereby generate the first-type gloss control image data. The first-type gloss control image data that is generated by the data generating unit 122 is vector format data expressed by the coordinates of points, parameters of equations of the lines or faces joining those points, and a collection of drawing areas representing filling or special effects.

The data generating unit 122 generates original data by integrating the first-type gloss control image data, the first-type color image data of the target image, and the first-type clear image data; and sends the original data to the print data generating unit 20 and to the display processing unit 15.

Given below is the explanation about the print data generating unit 20.

The print data generating unit 20 generates print data on the basis of the original data that has been received. The print data contains the original data and a job command to be issued to a printer. The job command can include, for example, printer settings, aggregation settings, duplexing settings, and the like. Meanwhile, the print data can either be converted into a page description language (PDL) such as PostScript or be kept as it is in the PDF format if the DFE 30 is PDF compatible. Then, the print data generating unit 20 outputs the print data to the DFE 30.

Given below is the explanation with reference to FIG. 2 about the display processing unit 15.

The display processing unit 15 receives the original data from the original data generating unit 10; generates a print preview of the projected printing result of the original data; and instructs the display unit 99D to display the print preview.

As illustrated in FIG. 2, the display processing unit 15 includes an original data receiving unit 200A, an analyzing unit 200L (an analyzing unit), a classified image data generating unit 200F (a generating unit), a classified image data storing unit 200G, a display image generating unit 200H (a first correcting unit, a second correcting unit), a correction information generating unit 200K, a receiving unit 200M (a receiving unit), a correction information storing unit 200I, and a display control unit 200J.

The analyzing unit 200L includes a structure analyzing unit 200B (a structure analyzing unit), an object structure list storing unit 200C, a classifying unit 200D (a classifying unit), and a classification list storing unit 200E.

Meanwhile, as the object structure list storing unit 200C, a primary memory 201B (described later), the classified image data storing unit 200G, and the correction information storing unit 200I; it is possible to either use a primary memory such as a RAM or use a memory medium such as a hard disk drive (HDD).

The original data receiving unit 200A receives the original data from the original data generating unit 10 and makes the original data referable in the display processing unit 15. More particularly, the original data receiving unit 200A refers to the file extension or the file header of the image data in the page that is instructed to be the preview target, and determines whether or not the file format is processible in the display processing unit 15. Then, the original data receiving unit 200A makes the original data processible, such as by releasing the file lock, and expands the original data in the primary memory 201B disposed therein.

The analyzing unit 200L analyzes the original data received by the original data receiving unit 200A. As described above, more particularly, the analyzing unit 200L includes the structure analyzing unit 200B, the object structure list storing unit 200C, the classifying unit 200D, and the classification list storing unit 200E.

The structure analyzing unit 200B analyzes the data structure of the original data that has been expanded in the primary memory 201B, and creates an object structure list in which the drawing areas (hereinafter, sometimes referred to as "objects") included in each page of the original data are listed.

Thus, the object structure list is a list of drawing areas included in each page of the original data. More particularly, the structure analyzing unit 200B analyzes one or more objects, which are the drawing areas, included in the first-type color image data, the first-type gloss control image data, and the first-type clear image data; and creates an object structure list that indicates the drawing information of each object (i.e., position, color space, color density of each drawing areas).

FIG. 11 illustrates an exemplary structure of the original data. Herein, assume that the original data receiving unit 200A receives the original data having the structure illustrated in FIG. 11 as the target original data for previewing.

The original data contains drawing information that indicates one or more drawing areas (objects) in a single page (in the same page), which are specified by the first-type color image data, the first-type gloss control image data, and the first-type clear image data. In FIG. 11, it is illustrated that, for example, the original data contains five objects, namely, an object 1 to an object 5 in the first page.

In the example illustrated in FIG. 11, the object 1 represents the drawing area in a color image that is specified by the first-type color image data. The object 2 represents the drawing area in a transparent image specified by the first-type clear image data. Each of the objects from the object 3 to the object 5 represents a drawing area specified by the first-type gloss control image data.

The image data contains, for each object, the drawing information in the form of the position of the drawing area, the color space of the drawing area, and the color density of the drawing area. The position of a drawing area is indicated by, for example, coordinate information or a collection of coordinate information. The color space indicates whether the corresponding drawing area (object) is a color image, or a transparent image, or a gloss area. In FIG. 11 as well as in the subsequent diagrams, a transparent image is sometimes referred to as "R-clear"; a gloss area is sometimes referred to as "R-effect"; and a color image sometimes referred to as "RGB". Regarding the color density of each object, the explanation is given for a case when the color density value is set in the range from 0% to 100%. In the example illustrated in FIG. 11, a group of drawing areas in a color image specified by the first-type color image data is considered as a single object (a single drawing area).

Returning to the explanation with reference to FIG. 2, the structure analyzing unit 200B analyzes one or more drawing areas that may be included in the original data, and determines whether each drawing area is a drawing area of a color image specified by the first-type color image data, or a drawing area of a transparent image specified by the first-type clear image data, or a drawing area specified by the first-type gloss control image data. The structure analyzing unit 200B reads the color space indicated in the drawing information of a drawing area (object); and analyzes whether that drawing area is a color image, or a gloss area, or a transparent image. In other words, the structure analyzing unit 200B analyzes whether a drawing area (object) is specified by the first-type color image data, or by the first-type gloss control image data, or by the first-type clear image data.

Then, the structure analyzing unit 200B creates an object structure list that contains a list of the drawing areas of color images specified by the first-type color image data, the drawing areas of transparent images specified by the first-type clear image data, and the drawing areas specified by the first-type gloss control image data.

The object structure list represents the objects, which are included in a page of the original data, in the form of a tree structure.

The object structure list storing unit 200C stores therein the object structure list, which is the analysis result obtained by analyzing the original data by the structure analyzing unit 200B.

The classifying unit 200D classifies the objects (drawing areas) that are listed in the object structure list into a group of drawing areas in a color image specified by the first-type color image data, a group of drawing areas in a transparent image specified by the first-type clear image data, and a group of drawing areas specified by the first-type gloss control image data; and generates an object classification list. Thus, the object classification list is a list of pointers, each starting from a group of objects and pointing the corresponding objects stored in the object structure list storing unit 200C. Thus, the actual drawing information is stored in the object structure list storing unit 200C. The object classification list is then stored in the classification list storing unit 200E.

On the basis of the original data, more specifically, on the basis of the object structure list and the object classification list; the classified image data generating unit 200F generates display image data in the form of second-type color image data, second-type clear image data, and second-type gloss control image data.

The second-type color image data is obtained by converting the first-type color image data into display image data having a displayable format in the display unit 99D. More particularly, the second-type color image data is obtained by converting the first-type color image data into raster format image data in which a single pixel is expressed with, for example, eight bits.

From the object structure list storing unit 200C, the classified image data generating unit 200F reads the drawing information on the drawing areas in the group of drawing areas in a color image specified by the first-type color image data. Then, the classified image data generating unit 200F converts the drawing information on the drawing areas in that group of drawing areas into raster format drawing information; integrates the raster format drawing information; and considers that group of drawing information as a data group on the same page. Subsequently, according to the positional relationship or the anteroposterior relationship of the drawing areas included in the raster format drawing information, the classified image data generating unit 200F generates the second-type color image data.

The second-type clear image data is obtained by converting the first-type clear image data into display image data having a displayable format in the display unit 99D. More particularly, the second-type clear image data is obtained by converting the first-type clear image data into raster format image data in which a single pixel is expressed with, for example, eight bits.

From the object structure list storing unit 200C, the classified image data generating unit 200F reads the drawing information of the drawing areas in the group of drawing areas in a transparent image specified by the first-type clear image data. Then, the classified image data generating unit 200F converts the drawing information of the drawing areas in that group of drawing areas into raster format drawing information; integrates the raster format drawing information; and considers that group of drawing information as a data group on the same page. Subsequently, according to the positional relationship or the anteroposterior relationship of the drawing areas included in the raster format drawing information, the classified image data generating unit 200F generates the second-type clear image data.

The second-type gloss control image data is obtained by converting the first-type gloss control image data into display image data having a displayable format in the display unit 99D. More particularly, the second-type gloss image data is obtained by converting the first-type gloss control image data into raster format image data in which a single pixel is expressed with, for example, eight bits.

From the object structure list storing unit 200C, the classified image data generating unit 200F reads the drawing information of the drawing areas in the group of drawing areas in a gloss area specified by the first-type gloss control image data. Then, the classified image data generating unit 200F converts the drawing information of the drawing areas in that group of drawing areas into raster format drawing information; integrates the raster format drawing information; and considers that group of drawing information as a data group on the same page. Subsequently, according to the positional relationship or the anteroposterior relationship of the drawing areas included in the raster format drawing information, the classified image data generating unit 200F generates the second-type gloss control image data.

The classified image data storing unit 200G stores therein the second-type color image data, the second-type clear image data, and the second-type gloss control image data generated by the classified image data generating unit 200F.

The correction information storing unit 200I stores therein a plurality of managing tables (described later). In the first embodiment, the correction information storing unit 200I stores therein three managing tables, namely, a gloss control managing table, a transparent image managing table, and a gloss highlighting managing table.

In the gloss control managing table; the types of gloss effect, the color density values corresponding to the types of gloss effect, and the color saturation adjustment values of pixels in the second-type transparent image data are stored in a corresponding manner. In the transparent image managing table; the color density values of pixels in the second-type clear image data are stored in a corresponding manner to the color saturation adjustment values of pixels in the second-type color image data. In the gloss highlighting managing table; the color density values (the types of gloss effect) of pixels in the area other than a gloss area corresponding to the type of gloss effect to be subjected to gloss highlighting are stored in a corresponding manner to the color saturation adjustment values of pixels in first-type corrected image data (described later).

Meanwhile, these managing tables are used in adjusting the color saturation of pixels in the second-type color image data. The details of color saturation adjustment are given later.

The correction information generating unit 200K generates correction information that contains color saturation adjustment values, and stores the correction information in the managing tables that are stored in the correction information storing unit 200I. The correction information generating unit 200K includes a memory 201K for storing in advance a first table and a second table. As illustrated in FIG. 12A, the first table is used to store automatic color saturation adjustment values of pixels in the second-type color image data corresponding to the color density values of pixels in the transparent images defined by the second-type clear image data. As illustrated in FIG. 12B, the second table is used to store automatic color saturation adjustment values corresponding to the color density values and the types of gloss effect in pixels in the gloss areas defined by the second-type gloss control image data. Herein, automatic color saturation adjustment values are predetermined values set as adjustment values for color saturation of pixels in the second-type color image data.

The receiving unit 200M receives the correction information from the operating unit 99B and outputs it to the correction information generating unit 200K. Meanwhile, the correction information stored in the managing tables is input by the user by operating the operating unit 99B.

For example, in the correction information storing unit 200I, input screen information is stored in advance as information about an input screen that is to be displayed on the display unit 99D when the user performs color saturation adjustment setting of the second-type color image data. Then, as a result of user operations with respect to the operating unit 99B, a signal indicating the start of color saturation adjustment setting or a signal indicating the start of display processing is input to the display processing unit 15. Consequently, on the display unit 99D, the display control unit 200J displays the input screen having thereon the input screen information stored in the correction information storing unit 200I. Subsequently, from the receiving unit 200M, the correction information generating unit 200K receives a variety of information that is set by the user by operating the operating unit 99B, and stores the received information in the managing tables, to thereby generate correction information.

Figure 13:
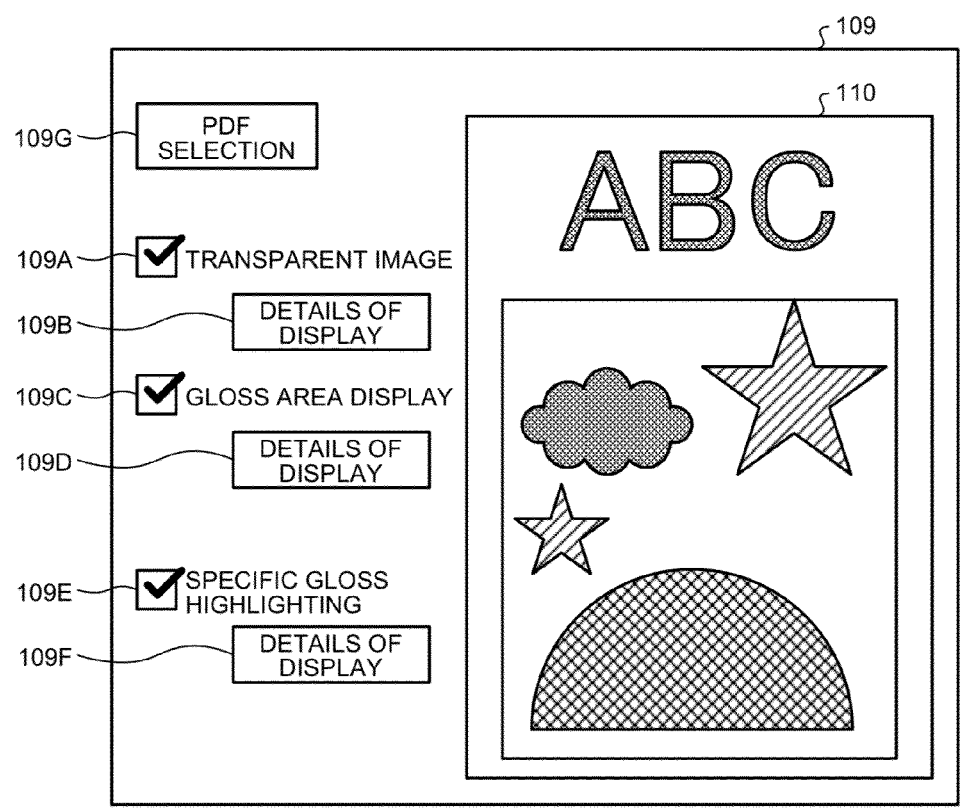
FIG. 13 is a schematic diagram illustrating an example of an input screen.

For example, an input screen 109 illustrated in FIG. 13 is displayed on the display unit 99D. The input screen 109 has a "PDF selection" button 109G, a "transparent image" checkbox 109A, a "details of display" button 109B, a "gloss area display" checkbox 109C, a "details of display" button 109D, a "specific gloss highlighting" checkbox 109E, a "details of display" button 109F, and a preview screen 110.

The "PDF selection" button 109G is a button displayed to allow specification of the target original data for previewing.

The "transparent image" checkbox 109A is a checkbox displayed to allow setting of whether or not to perform color saturation adjustment of pixels in the second-data color image data. The "details of display" button 109B is a button displayed to allow issuing an instruction to display an input screen for performing setting of color saturation adjustment when the "transparent image" checkbox 109A is checked.

The "gloss area display" checkbox 109C is a checkbox displayed to allow setting of whether or not to perform color saturation adjustment of pixels in the second-type color image data depending on the color density values of pixels in the second-type gloss control image data. The "details of display" button 109D is a button displayed to allow issuing an instruction to display an input screen for performing setting of color saturation adjustment when the "gloss area display" checkbox 109C is checked.

The "specific gloss highlighting" checkbox 109E is a checkbox displayed to allow setting of whether or not to perform gloss highlighting with respect to any of the plurality of types of gloss effect. The "details of display" button 109F is a button displayed to allow issuing an instruction to display an input screen for performing setting of gloss highlighting when the "specific gloss highlighting" checkbox 109E is checked.

More particularly, assume that the user operates the operating unit 99B and selects the "PDF selection" button 109G in the input screen 109. In that case, the display control unit 200J displays a file selection screen (not illustrated) on the display unit 99D and displays a list of sets of original data received by the original data receiving unit 200A. Subsequently, when the user selects one set of the original data by operating the operating unit 99B, the analyzing unit 200L performs an analyzing operation (described later). As a result, the second-type color image data, the second-type clear image data, and the second-type gloss control image data gets stored in the classified image data storing unit 200G.

Then, the display control unit 200J reads the second-type image color data corresponding to the original data stored in the classified image data storing unit 200G, and displays that second-type image color data on the display unit 99D.

Then, assume that the user operates the operating unit 99B and inputs a checkmark in the "transparent image" checkbox 109A in the input screen 109. In that case, on the preview screen 110, the display control unit 200J displays a composite image that is obtained by synthesizing the second-type color image data and the second-type clear image data stored in the classified image data storing unit 200G.

At that time, regarding the second-type clear image data, the color of a transparent image specified by the second-type clear image data is converted into a predetermined display color (such as light blue), and then the transparent image is displayed on the preview screen 110 with the color density value specified by the second-type clear image data. This display color for displaying transparent images can be stored in advance in a memory (not illustrated), and then, while displaying the composite image, the color of a transparent image in the second-type clear image data can be converted into that display color.

Then, assume that the user selects the "details of display" button 109D by operating the operating unit 99B.

Figure 14A:
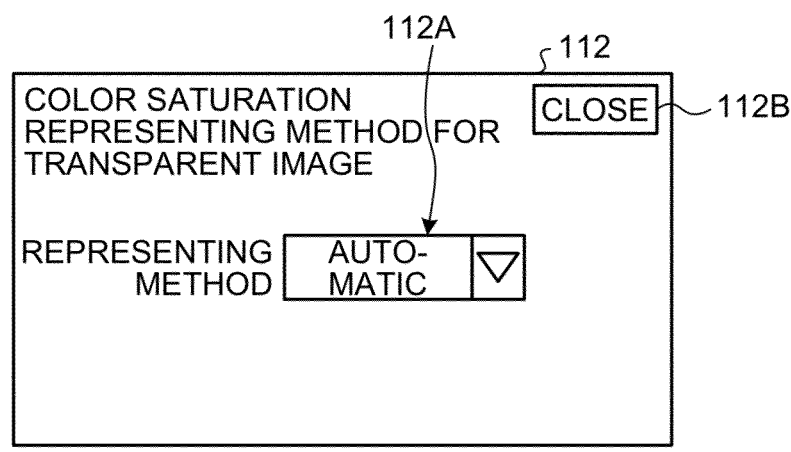
FIGS. 14A and 14B are diagrams illustrating examples of an input screen used to perform detailed settings of a transparent image, where

In that case, on the display unit 99D, the display control unit 200J displays an input screen 112 (see FIG. 14A) that allows setting of color saturation adjustment values of pixels in the second-type color image data depending on the color density values of pixels in the second-type clear image data.

The input screen 112 has a button 112A that allows selection of "automatic" or "manual" as the method of expressing the color saturation of a transparent image, and has a button 112B that allows issuing an instruction to return to the input screen 109.

If the user selects "automatic" in the button 112A by operating the operating unit 99B; then the correction information generating unit 200K stores, in the transparent image managing table, the automatic color saturation adjustment values that are stored in the first table in a corresponding manner to the color density values at pixel positions of pixels in the second-type clear image data as automatic color saturation adjustment values at corresponding pixels positions of pixels in the second-type color image data.

On the other hand, if the user selects "manual" in the button 112A by operating the operating unit 99B, then the display control unit 200J additionally displays a slide bar 112C on the input screen 112 (see FIG. 14B) for allowing manual setting of color saturation adjustment values of pixels in the second-type color image data corresponding to the color density values of pixels in the second-type clear image data.

The memory 201K is used to store a third table that has adjustment values written therein corresponding to the positions on the slide bar 112C. More particularly, as illustrated in FIG. 15A, in the third table, color saturation adjustment values corresponding to the expressions on the slide bar are stored in advance. Meanwhile, regarding any intermediate position between adjacent expressions, the corresponding color saturation adjustment value can be calculated from the third table.

When the user operates the operating unit 99B and slides the display position of an instruction mark 112D on the slide bar 112C, the color saturation adjustment value of each pixel in the second-type color image data gets adjusted manually.

Figure 14B:
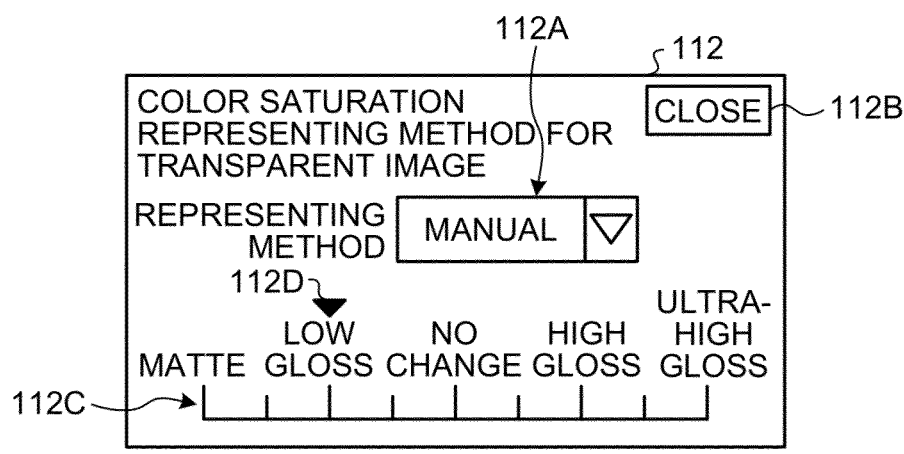

In the example illustrated in FIG. 14B, the instruction mark 112D is positioned to indicate "low gloss" on the slide bar 112C. In that case, as the manual color saturation adjustment value with respect to the color density value at the pixel position of each pixel in the second-type clear image data; the correction information generating unit 200K stores, in the transparent image managing table, the color saturation adjustment value that is stored in the third table in a corresponding manner to "low gloss".

With that, the correction information generating unit 200K generates the transparent image managing table in which correction information containing color saturation adjustment values for transparent images is stored.

FIG. 15B illustrates an example of the transparent image managing table. As illustrated in FIG. 15B, in the transparent image managing table, automatic color saturation adjustment values and manual color saturation adjustment values are stored in a corresponding manner to the color density values at pixel positions of pixels in the second-type clear image data (i.e., the color density values of pixels constituting a transparent image). The correction information generating unit 200K generates such a transparent image managing table and stores it in the correction information storing unit 200I.

Returning to the explanation with reference to FIG. 13, assume that the user operates the operating unit 99B and inputs a checkmark in the "gloss area display" checkbox 109C in the input screen 109. In that case, on the preview screen 110, the display control unit 200J displays the composite image that is obtained by synthesizing the second-type color image data and the second-type gloss control image data stored in the classified image data storing unit 200G.

At that time, a gloss area specified by the second-type gloss control image data can be set to have the display color corresponding to the type of that gloss area and can be displayed on the preview screen 110 with the color density value specified by the second-type gloss control image data. Herein, the display color of a gloss area can be stored in advance in a memory (not illustrated) in a corresponding manner to the type of gloss effect. Then, the composite image can be displayed on the preview screen 110 after the colors of gloss areas in the second gloss control image data are converted into the display colors corresponding to the types of those gloss areas.

Then, assume that the user selects the "details of display" button 109D by operating the operating unit 99B.

In that case, the display control unit 200J displays an input screen 114 on the display unit 99D (see FIG. 16A) for allowing setting of color saturation adjustment values at pixel positions of pixels in the second-type color image data corresponding to the color density values (i.e., the types of gloss effect) at pixel positions of pixels in the second-type gloss control image data.

The input screen 114 allows, for each type of gloss effect, setting of color saturation adjustment values at pixel positions of pixels in the second-type color image data that correspond to the gloss area to which that particular type of gloss effect is to be given. The input screen 114 includes a button 114B that allows selection of the type of gloss effect that is to be set; a button 114C that allows selection of "automatic" or "manual" as the method of expressing the color saturation of the types of gloss effect; and a button 114D that allows issuing an instruction to return to the input screen 109.

The memory 201K is used to store in advance a correspondence table (see FIG. 17) in which color density values of pixels in the second-type gloss control image data are stored in a corresponding manner to gloss effect names given to the types of gloss effect. Thus, when the color saturation adjustment values of pixels in the second-type color image data are set via the input screen 114, the color saturation adjustment values corresponding to the color density values of pixels in the second gloss control image data get set.

Figure 16A:
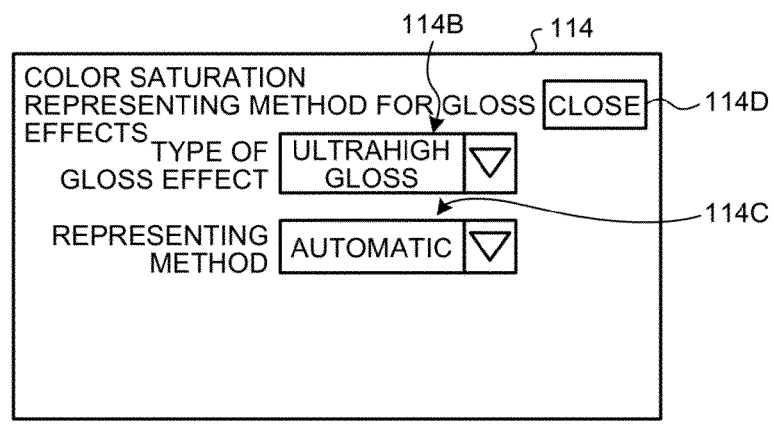
FIGS. 16A and 16B are diagrams illustrating examples of an input screen used to perform detailed settings of a gloss effect, where

Returning to the explanation with reference to FIG. 16A, when the user selects the button 114B by operating the operating unit 99B, the type of gloss effect that is to be set gets selected. Then, the user operates the operating unit 99B and selects "automatic" in the button 114C. In that case, in the gloss control managing table, the correction information generating unit 200K stores "automatic" as the adjustment method for the selected type of gloss effect. Meanwhile, automatic color saturation adjustment values, which are stored in the second table (see FIG. 12B) and which correspond to the types of gloss effect in the second-type gloss control image data (or the color density values corresponding to the types of gloss effect), are stored in advance in the gloss control managing table.

On the other hand, when the user operates the operating unit 99B and selects "manual" using the button 114C, the display control unit 200J additionally displays a slide bar 114E on the input screen 112 (see FIG. 16B) for allowing manual setting of color saturation adjustment values at pixel positions of pixels in the second-type color image data corresponding to the color density values of pixels (types of gloss effect) in the second-type gloss control image data.

Herein, as the color saturation values corresponding to the expressions on the slide bar 114E, the color saturation values stored in the third table (see FIG. 15A) can be used in an identical manner to the slide bar 112C.

Subsequently, when the user operates the operating unit 99B and slides the display position of an instruction mark 114F on the slide bar 114E, the color saturation adjustment value of each pixel in the second-type color image data gets adjusted manually.

Figure 16B:
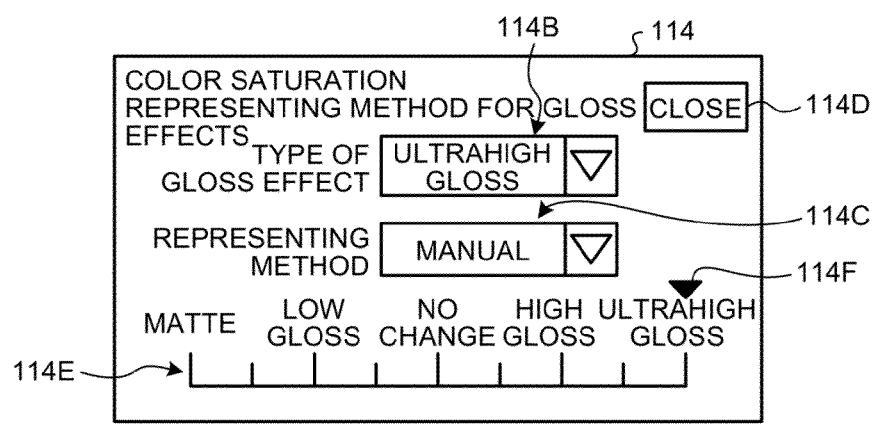

In the example illustrated in FIG. 16B, the instruction mark 114F is positioned to indicate "ultrahigh gloss" on the slide bar 114E. Moreover, in the display area of the button 114B, "ultrahigh gloss" is selected as the type of gloss effect to be set. In that case, as the color saturation adjustment value in the second-type color image data corresponding to the pixels that have the color density value of "ultrahigh gloss" in the second-type gloss control table; the correction information generating unit 200K stores, in the gloss control managing table, the color saturation adjustment value stored in the third table in a corresponding manner to "ultrahigh gloss".

With that, the correction information generating unit 200K generates a gloss control managing table in which correction information containing the color saturation adjustment values for gloss control is stored. For example, the correction information generating unit 200K generates a gloss control managing table as illustrated in FIG. 18.

As illustrated in FIG. 18, the gloss control managing table is used to store the types of gloss effect, the color density values, the adjustment methods, the automatic color saturation adjustment values, and the manual color saturation adjustment values in a corresponding manner. The adjustment methods represent the information indicating either "automatic" or "manual" that is set using the button 114C in the input screen 114 (see FIG. 16A). As illustrated in FIG. 16A, assume that "ultrahigh gloss" is specified as the type of gloss effect and "automatic" is selected as the expression method. In that case, the correction information generating unit 200K sets "automatic" as the adjustment method mentioned in the gloss control managing table corresponding to "ultrahigh gloss".

As illustrated in FIG. 16B, assume that "ultrahigh gloss" is specified as the type of gloss effect and "manual" is selected as the expression method. Besides, assume that the instruction mark 114F on the slide bar 114E is positioned to indicate "ultrahigh gloss". In that case, the correction information generating unit 200K sets "manual" as the adjustment method mentioned in the gloss control managing table corresponding to "ultrahigh gloss". Moreover, from the second table (see FIG. 12B), the correction information generating unit 200K reads the automatic color saturation adjustment value corresponding to the display position of the instruction mark 114F, and stores that automatic color saturation adjustment value as the manual color saturation adjustment value corresponding to "ultrahigh gloss" in the gloss control managing table.

Returning to the explanation with reference to FIG. 13, assume that the user operates the operating unit 99B and inputs a checkbox in the "specific gloss highlighting" checkbox 109E in the input screen 109. In that case, on the preview screen 110, the display control unit 200J displays the composite image obtained by synthesizing the second-type color image data and the second-type gloss control image data stored in the classified image data storing unit 200G.

At that time, regarding the second-type gloss control image data, the color of a gloss area specified by the second-type gloss control image data is converted into a display color corresponding to the type of that gloss area, and then the gloss area is displayed on the preview screen 110 with the color density value specified by the second-type gloss control image data. Such display colors of gloss areas can be stored in advance in a memory (not illustrated) in a corresponding manner to the types of gloss area, and then, while displaying the composite image, the color of a gloss area in the second-type gloss control image data can be converted into the display color corresponding to the type of that gloss area, and then the composite image can be displayed on the preview screen 110.

Then, assume that the user operates the operating unit 99B and selects the "details of display" button 109F.

In that case, the display control unit 200J sets the type of gloss effect that is to be subjected to gloss highlighting; and displays, on the display unit 99D, an input screen 116 (see FIG. 19A) that allows setting of color saturation adjustment values at pixel positions of pixels corresponding to the area other than the area to be subjected to gloss highlighting. Meanwhile, although described later in detail, the first-type corrected image data points to the second-type color image data obtained after the correction of color saturation has been performed according to the gloss control managing table and the transparent image managing table.

The input screen 116 includes a button 116A that allows selection of the type of gloss effect that is to be subjected to gloss highlighting; a button 116C that allows selection of "automatic" or "manual" as the method of expressing the color saturation of the area other than the area to be subjected to gloss highlighting; and includes a button 116B that allows issuing an instruction to return to the input screen 109.

Meanwhile, as described above, the memory 201K is used to store in advance the correspondence table (see FIG. 17) in which color density values of pixels in the second-type gloss control image data are stored in a corresponding manner to gloss effect names given to the types of gloss effect. Thus, the color saturation adjustment values at pixel positions of pixels in the second-type gloss control image data that correspond to the area other than the area to be subjected to gloss highlighting are set via the input screen 116.

Figure 19A:
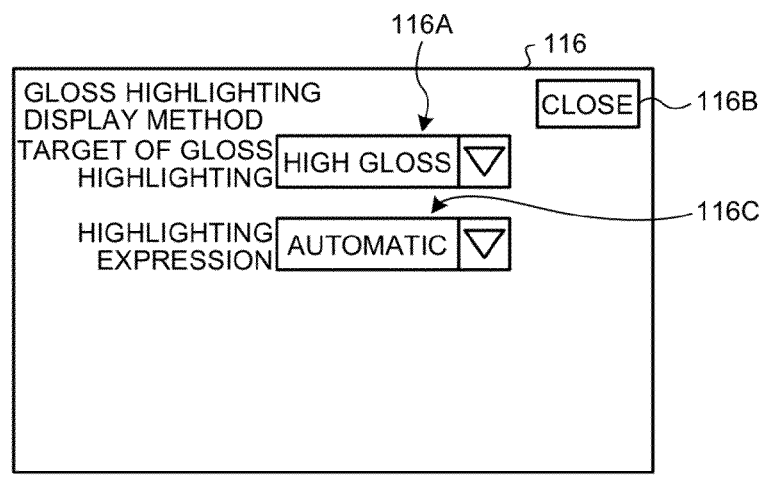
FIGS. 19A and 19B are diagrams illustrating examples of an input screen used to perform detailed settings of an area to be subjected to gloss highlighting, where

Returning to the explanation with reference to FIG. 19A, when the user operates the operating unit 99B and selects the button 116A, the type of gloss effect to be subjected to gloss highlighting gets selected. Moreover, assume that the user operates the operating unit 99B and selects "automatic" in the button 116B. In that case, in the gloss highlighting managing table, the correction information generating unit 200K stores "automatic" as the adjustment method for the selected type of gloss effect that is to be subjected to gloss highlighting. Meanwhile, automatic color saturation adjustment values, which are stored in the second table (see FIG. 12B) and which correspond to the types of gloss effect in the second-type gloss control image data (or the color density values corresponding to the types of gloss effect), are stored in advance in the gloss highlighting managing table.

On the other hand, if the user operates the operating unit 99B and selects "manual" in the button 116C, then the display control unit 200J additionally displays a slide bar 116D on the input screen 116 (see FIG. 19B) for allowing manual setting of color saturation adjustment values at pixel positions of pixels in the second-type color image data that correspond to the area other than the area to be subjected to gloss highlighting in the second-type gloss control image data.

Herein, as the color saturation values corresponding to the expressions on the slide bar 116D, the color saturation values stored in the third table (see FIG. 15A) can be used in an identical manner to the slide bar 112C.

Subsequently, when the user operates the operating unit 99B and slides the display position of an instruction mark 116F on the slide bar 116D, it results in manual adjustment of the color saturation adjustment values at pixel positions of pixels in the second-type color image data that correspond to the area other than the area to be subjected to gloss highlighting in the second-type gloss control image data.

Figure 19B:
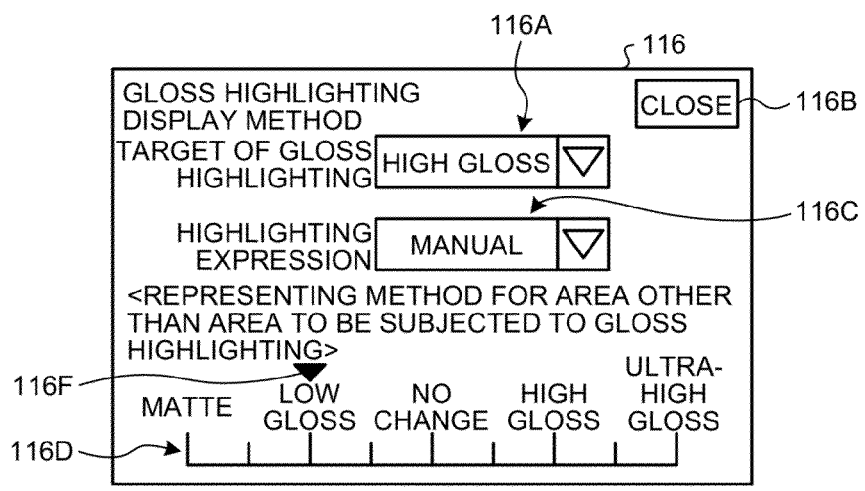

In the example illustrated in FIG. 19B, the instruction mark 116F is positioned to indicate "low gloss" on the slide bar 116D. Moreover, in the display area of the button 116A, "high gloss" is selected as the type of gloss effect to be subjected to gloss highlighting. In that case, the correction information generating unit 200K reads the color saturation adjustment value corresponding to the "high gloss" from the third table. Then, in the gloss control managing table, the correction information generating unit 200K stores that color saturation adjustment value as the manual color saturation adjustment value at pixel positions of pixels in the second-type color image data that correspond to the area other than the area to be subjected to gloss highlighting in the second-type gloss control image data.

With that, for example, the correction information generating unit 200K generates the gloss highlighting managing table as illustrated in FIG. 20.

As illustrated in FIG. 20, in the gloss highlighting managing table; the types of gloss effect, the target setting, the color density values of pixels in the second-type gloss control image data, the adjustment methods, the automatic color saturation adjustment values, and the manual color saturation adjustment values are stored in a corresponding manner.

The types of gloss effect mentioned in the gloss highlighting managing table indicate the types of gloss effect to be subjected to gloss highlighting as specified using the button 116A on the input screen 116. The target setting mentioned in the gloss highlighting managing table indicates "target" for the types of gloss effect that are to be subjected to gloss highlighting and indicates "non-target" for the types of gloss effect that are not to be subjected to gloss highlighting. As illustrated in FIG. 19A and FIG. 19B, assume that "high gloss" is specified as the type of gloss effect to be subjected to gloss highlighting, and assume that the other types of gloss effect are not set in the input screen 116. In this case, as the target setting corresponding to "high gloss", the correction information generating unit 200K stores "target" in the gloss highlighting managing table. Moreover, as the target setting corresponding to the other types of gloss effect other than "high gloss" (in this case, as the target setting corresponding to "ultrahigh gloss", "no change", "low gloss", and "matte"), the correction information generating unit 200K sets "non-target" in the gloss highlighting managing table.

Meanwhile, in FIG. 17 and FIG. 18, "no change" indicates that no gloss effect is given. That is, "no change" indicates that the clear toner is not used.

The adjustment methods mentioned in the gloss highlighting managing table indicates either "manual" or "automatic" as per the setting done using the button 116C on the input screen 116 (see FIG. 19A and FIG. 19B). That is, as illustrated in FIG. 19A, assume that "high gloss" is specified as the type of gloss to be subjected to gloss highlighting and "automatic" is selected as the highlighting expression. In that case, as illustrated in FIG. 20, the correction information generating unit 200K sets "automatic" as the adjustment method corresponding to "high gloss" in the gloss highlighting managing table.

On the other hand, as illustrated in FIG. 19B, assume that "high gloss" is specified as the type of gloss effect to be subjected to gloss highlighting and "manual" is selected as the highlighting expression. In that case, the correction information generating unit 200K sets "manual" as the adjustment method corresponding to "high gloss" in the gloss highlighting managing table. Moreover, from the second table (see FIG. 12B), the correction information generating unit 200K reads the automatic color saturation adjustment value corresponding to the display position of the instruction mark 116F. Then, in the gloss highlighting managing table, the correction information generating unit 200K stores that automatic color saturation adjustment value as the manual color saturation adjustment value corresponding to the other types of gloss effect other than "high gloss" that is set as the type of gloss effect to be subjected to gloss highlighting (see FIG. 20).

In this way, the correction information generating unit 200K generates the correction information; stores a variety of correction information in the gloss control managing table, the transparent image managing table, and the gloss highlighting managing table; as well as stores the correction information in the correction information storing unit 200I.

The correction information contains the color density values, the automatic color saturation adjustment values, and the manual color saturation adjustment values of pixels in the second-type gloss control image data and the second-type clear image data. Moreover, the correction information corresponding to the second-type gloss control image data further contains the adjustment method, which is the information indicating either "manual" or "automatic". Meanwhile, the color density value of each pixel in the second-type gloss control image data also indicates the type of gloss effect. For that reason, the correction information that is stored in the gloss control managing table and the gloss highlighting managing table also contains the types of gloss effect.

Returning to the explanation with reference to FIG. 2, explained below is the display image generating unit 200H.

The display image generating unit 200H corrects the color saturation of each pixel in the second-type color image data that is stored in the classified image data storing unit 200G, to thereby generate display images (a first-type corrected image and a second-type corrected image).

The display image generating unit 200H includes a first-type corrected image generating unit 202 and a second-type corrected image generating unit 204.

The first-type corrected image generating unit 202 generates the first-type corrected image data by correcting the color saturation of each pixel in the second-type color image data according to the correction information stored in the gloss control managing table and the transparent image managing table. The first-type corrected image generating unit 202 includes a primary memory unit 202A that is used to expand a variety of data at the time of generating the first-type corrected image data. The first-type corrected image generating unit 202 performs a first-type corrected image generating operation, the details of which are explained later.

The second-type corrected image generating unit 204 generates second-type corrected image data by correcting the color saturation of each pixel in the first-type corrected image data according to the correction information that is stored in the gloss highlighting managing table. The second-type corrected image generating unit 204 includes a primary memory unit 204A that is used to expand a variety of data at the time of generating the second-type corrected image data. The second-type corrected image generating unit 204 performs a second-type corrected image generating operation, the details of which are explained later.

As the print preview of the original data; the display control unit 200J displays, on the display unit 99D, a display image of the first-type corrected image data or a display image of the second-type corrected image data generated by the display image generating unit 200H.

Given below is the explanation of a display operation performed by the display processing unit 15.

Figure 21:
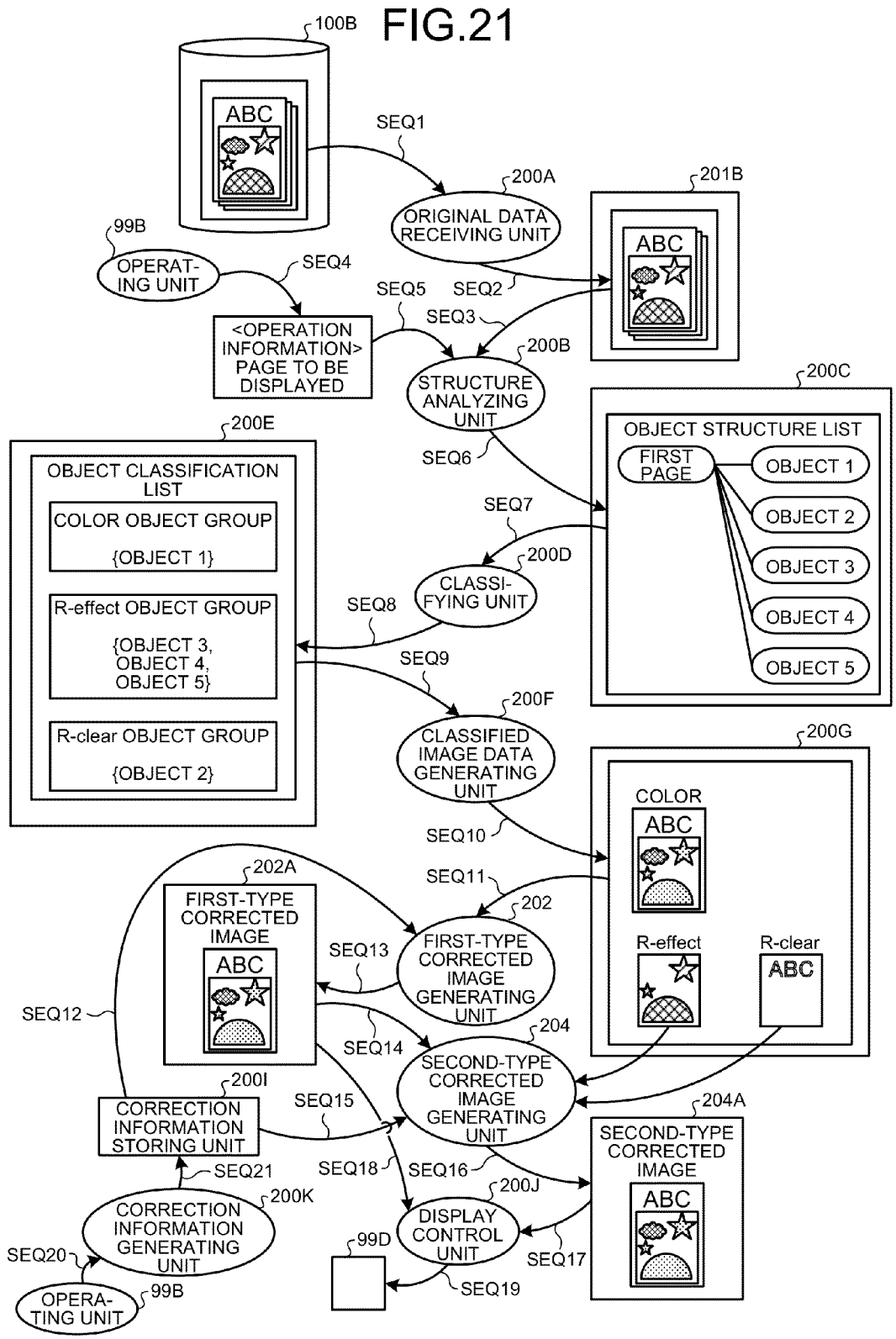
FIG. 21 is a sequence diagram illustrating a sequence of operations performed during an image displaying operation by a display processing unit according to the first embodiment.

FIG. 21 is a sequence diagram illustrating a sequence of operations performed during an image displaying operation by the display processing unit 15. More particularly, FIG. 21 is a sequence diagram illustrating a sequence of operations performed to display, on the display unit 99D, a display image of the projected printing result of the original data illustrated in FIG. 11.

Firstly, on the display unit 99D, the display processing unit 15 displays the input screen 109 illustrated in FIG. 13. Then, the user operates the operating unit 99B and selects the "PDF selection" button 109G for the purpose of selecting the original data to be previewed. Once the original data to be previewed is selected, the original data receiving unit 200A reads the selected original data from an original data storing unit 100B and expands that original data in the primary memory 201B (SEQ1, SEQ2).

Subsequently, when the user operates the operating unit 99B and selects the page to be displayed (SEQ4), the structure analyzing unit 200B reads the original data of the selected page from the primary memory 201B and analyzes that original data (SEQ3, SEQ5).

Then, the structure analyzing unit stores the object structure list, which is obtained as the analysis result, in the object structure list storing unit 200C (SEQ6).

Subsequently, the classifying unit 200D classifies the objects from the object 1 to the object 5 that are listed in the object structure list into three object groups, namely, a group of drawing areas in a color image specified by the first-type color image data, a group of drawing areas in a transparent image specified by the first-type clear image data, and a group of drawing areas in a gloss area specified by the first-type gloss control image data; and generates an object classification list (SEQ7, SEQ8).

Then, the classified image data generating unit 200F integrates and rasterizes the group of drawing areas in a color image specified in the object classification list and generates the second-type color image data. Moreover, the classified image data generating unit 200F integrates and rasterizes the group of drawing areas in a transparent image specified in the object classification list and generates the second-type clear image data. Furthermore, the classified image data generating unit 200F integrates and rasterizes the group of drawing areas in a gloss area and generates the second-type gloss control image data. In this way, the classified image data generating unit 200F generates the second-type color image data, the second-type gloss control image data, and the second-type clear image data (SEQ9, SEQ10).

The first-type corrected image generating unit 202 generates the first-type corrected image data by correcting the color saturation of each pixel in the second-type color image data according to the correction information specified in the gloss control managing table and the transparent image managing table, which are stored in the correction information storing unit 200I; and stores the first-type corrected image data in the primary memory unit 202A (SEQ12, SEQ11, SEQ13).

Then, the second-type corrected image generating unit 204 generates the second-type corrected image data by correcting the color saturation of each pixel in the first-type corrected image data according to the correction information specified in the gloss highlighting managing table that is stored in the correction information storing unit 200I; and stores the second-type corrected image data in the primary memory unit 204A (SEQ14, SEQ15, SEQ16).

Subsequently, in the case when the second-type corrected image data is generated, the display control unit 200J displays the second-type corrected image data as a display image on the display unit 99D; and in the case when the first-type corrected image data is generated, the display control unit 200J displays the first-type corrected image data as a display image on the display unit 99D (SEQ17, SEQ18, SEQ19).

Moreover, the correction information generating unit 200K generates the correction information according to an instruction received from the operating unit 99B; and stores the gloss control managing table, the transparent image managing table, and the gloss highlighting managing table in the correction information storing unit 200I (SEQ 20, SEQ 21).

Given below is the explanation of the image displaying operation performed by the display processing unit 15 that is configured in the abovementioned manner according to the first embodiment.

Figure 22:
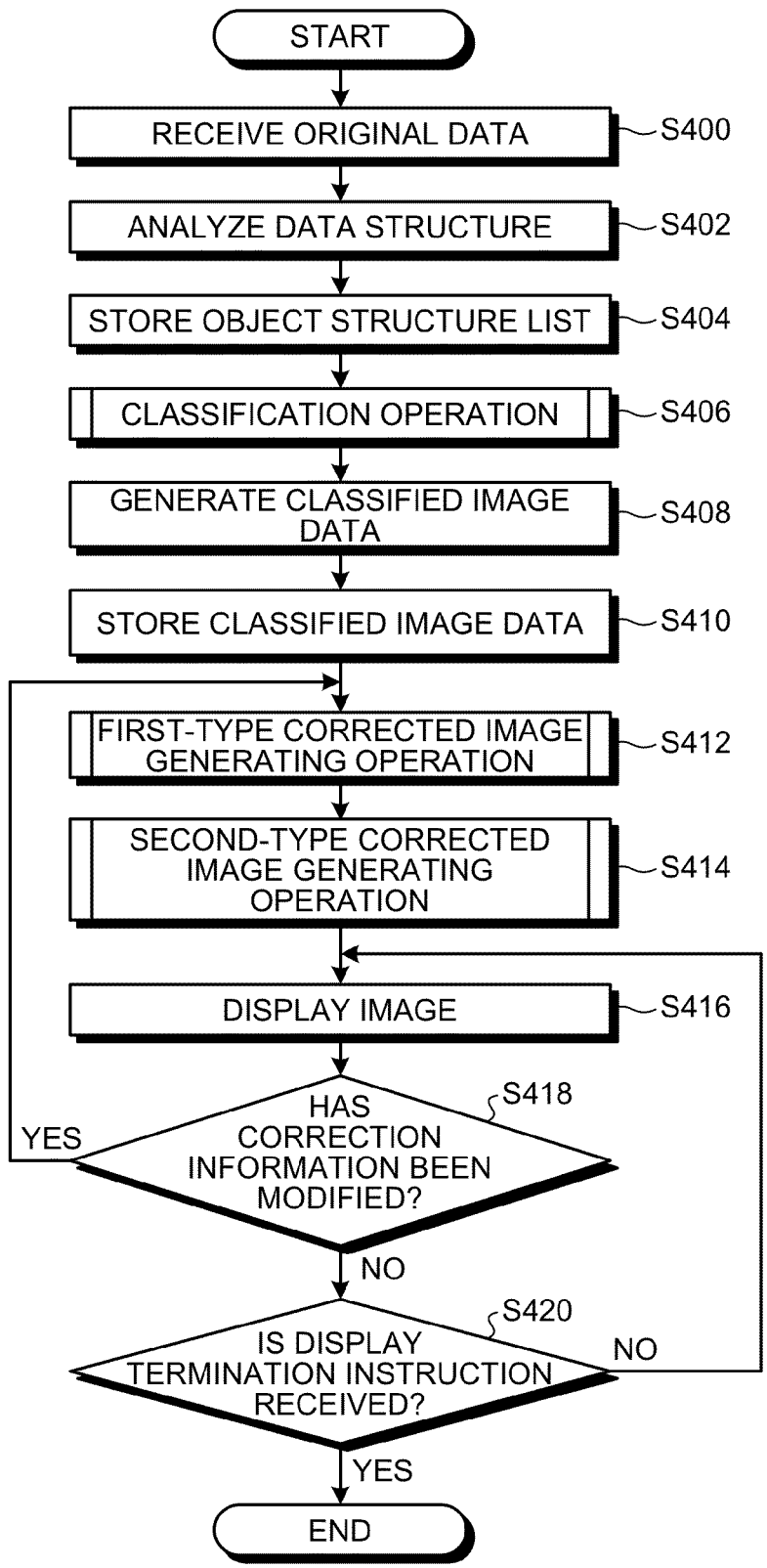
FIG. 22 is a flowchart for explaining a sequence of operations performed during the image displaying operation according to the first embodiment.

FIG. 22 is a flowchart for explaining a sequence of operations performed during the image displaying operation according to the first embodiment.

Firstly, the original data receiving unit 200A receives original data (Step S400). The original data received by the original data receiving unit 200A is expanded in the primary memory 201B.

Then, the structure analyzing unit 200B analyzes the data structure of the original data that has been expanded in the primary memory 201B, and creates an object structure list that contains the objects included in each page of the original data (Step S402). Subsequently, the structure analyzing unit 200B stores the object structure list in the object structure list storing unit 200C (Step S404).

Then, the classifying unit 200D performs a classification operation with respect to the original data (Step S406). The details of the classification operation are explained later.

Subsequently, the classified image data generating unit 200F generates display image data in the form of the second-type color image data, the second-type gloss control image data, and the second-type clear image data; and stores the display image data in the classified image data storing unit 200G (Step S408 and Step S410).

Then, the first-type corrected image generating unit 202 performs a first-type corrected image generating operation (Step S412). The details of the first-type corrected image generating operation performed at Step S412 are explained later.

Subsequently, the second-type corrected image generating unit 204 performs a second-type corrected image generating operation (Step S414). The details of the second-type corrected image generating operation performed at Step S414 are explained later.

Subsequently, on the display unit 99D, the display control unit 200J displays a display image of the display image data (the first-type corrected image data or the second-type corrected image data) that is generated by the display image generating unit 200H (Step S416).

Then, the display image generating unit 200H determines whether or not the correction information stored in the gloss control managing table, the transparent image managing table, and the gloss highlighting managing table has been modified (Step S418). The determination at Step S418 is performed in the following manner. For example, the display image generating unit 200H reads the three managing tables (the gloss control managing table, the transparent image managing table, and the gloss highlighting managing table) that are stored in the correction information storing unit 200I; and determines whether or not the correction information stored in the three managing tables is different than the contents that were read while generating the previous display image data (Step S412 and Step S414). With that, the display image generating unit 200H determines whether or not the correction information has been modified.

If it is determined that the correction information has been modified (Yes at Step S418), then the system control returns to Step S412, and the display image generating unit 200H performs the first-type corrected image generating operation (Step S412) as well as performs the second-type corrected image generating operation (Step S414) using the three managing tables (the gloss control managing table, the transparent image managing table, and the gloss highlighting managing table) that have been modified.

On the other hand, if it is determined that the correction information has not been modified (No at Step S418), then the display processing unit 15 determines whether or not a signal representing a display termination instruction is received via the operating unit 99B (Step S420). If it is determined that no such signal is received (No at Step S420), then the system control proceeds to Step S416. On the other hand, if such a signal is received (Yes at Step S420); then the present routine is terminated.

Given below is the explanation of the classification operation performed at Step S406.

Figure 23:
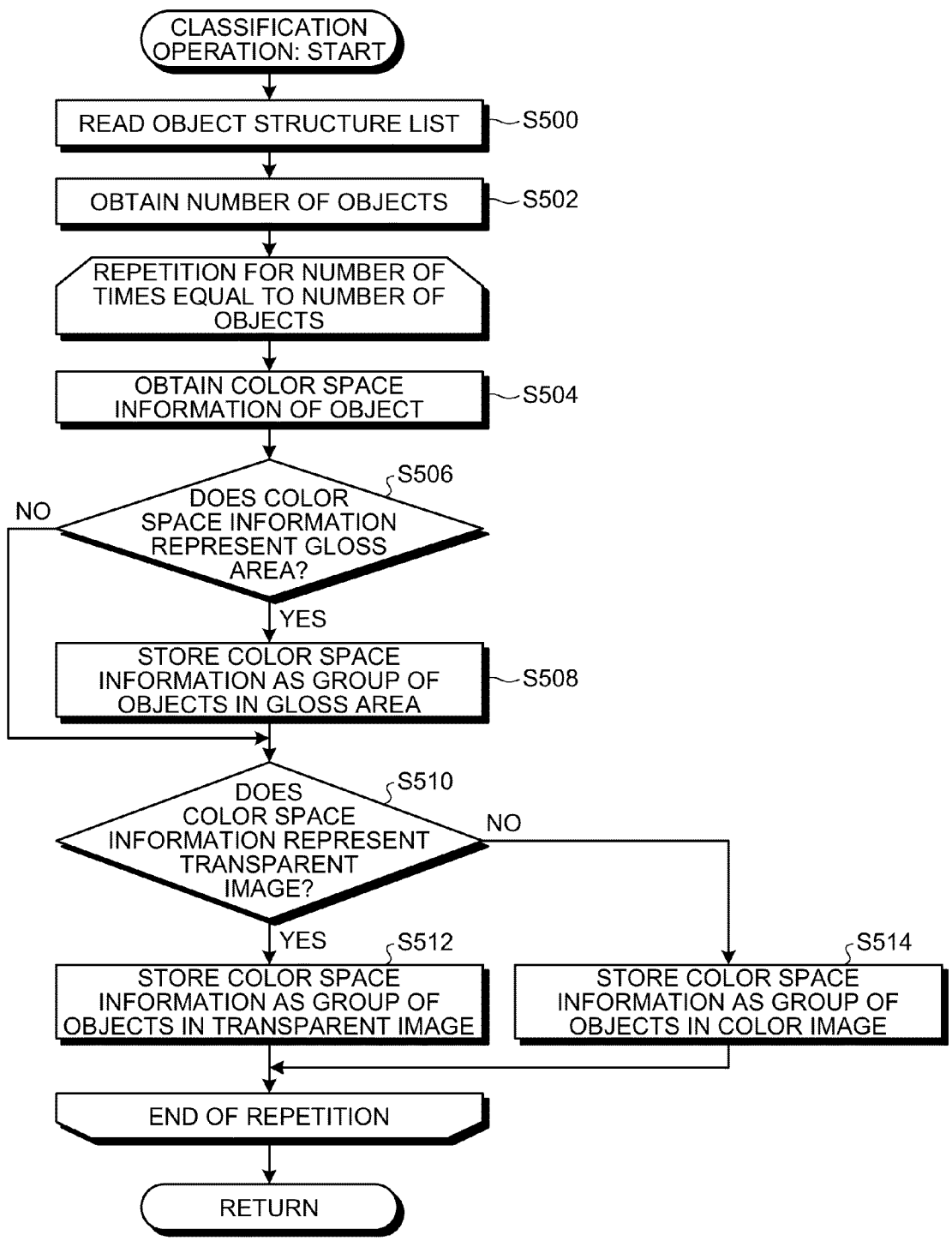
FIG. 23 is a flowchart for explaining a sequence of operations performed during a classification operation according to the first embodiment.

FIG. 23 is a flowchart for explaining a sequence of operations performed during the classification operation.

Firstly, the classifying unit 200D reads the object structure list from the object structure list storing unit 200C (Step S500).

Then, the classifying unit 200D obtains the number of objects specified in the object structure list that has been read (Step S502) and performs the operations starting from Step S504 (described later) to either Step S512 (described later) or Step S514 (described later) in a repeated manner for a number of times equal to the number of objects.

Then, the classifying unit 200D obtains color space information of a single object stored in the object structure list storing unit 200C (Step S504).

Subsequently, the classifying unit 200D determines whether or not the color space information obtained at Step S504 represents a gloss area (Step S506). If the color space information obtained at Step S504 represents a gloss area (Yes at Step S506); then the classifying unit 200D stores, in the classification list storing unit 200E, the color space information as a group of objects in the gloss area (Step S508).

When the operation at Step S508 is completed or if the color space information obtained at Step S504 does not represent a gloss area (No at Step S506), the system control proceeds to Step S510.

Subsequently, the classifying unit 200D determines whether or not the color space information obtained at Step S504 represents a transparent image (Step S510). If the color space information obtained at Step S504 represents a transparent image (Yes at Step S510); then the classifying unit 200D stores, in the classification list storing unit 200E, the color space information as a group of objects in the transparent image (Step S512).

On the other hand, if the color space information obtained at Step S504 does not represent a transparent image, that is, if the color space information obtained at Step S504 represents a color image (No at Step S510); then the classifying unit 200D stores, in the classification list storing unit 200E, the color space information as a group of objects in the color image (Step S514).

Given below is the explanation regarding the first-type corrected image generating operation performed at Step S412.

Figure 24:
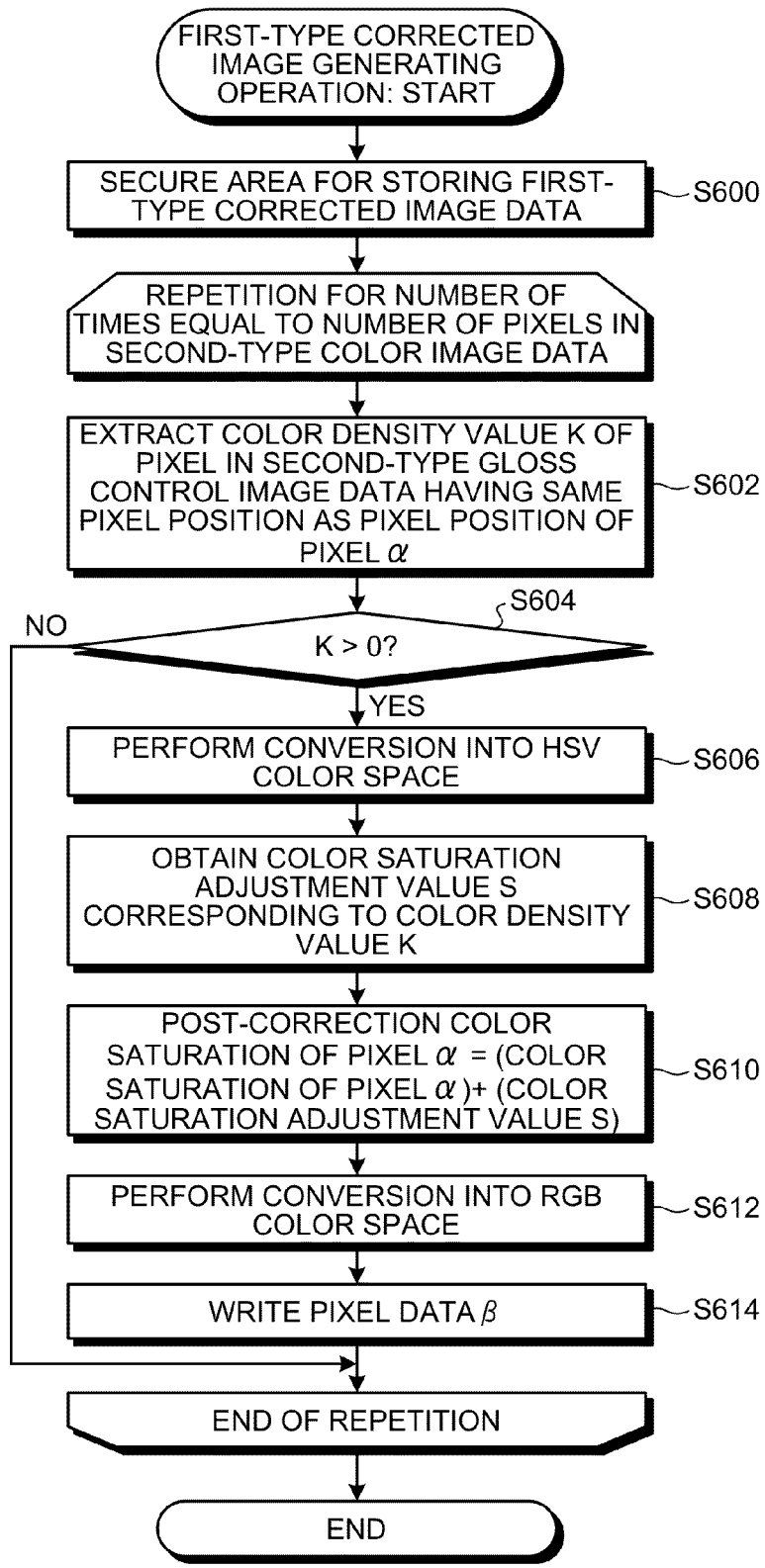
FIG. 24 is a flowchart for explaining a sequence of operations performed during a first-type corrected image generating operation according to the first embodiment.

FIG. 24 is a flowchart for explaining a sequence of operations performed during the first-type corrected image generating operation.

Firstly, the first-type corrected image generating unit 202 secures an area for the purpose of storing each set of pixel data of the first-type corrected image data to be created (Step S600). More particularly, the first-type corrected image generating unit 202 secures the primary memory unit 202A in a RAM for the purpose of storing each set of pixel data of the first-type corrected image data to be created.

Then, the first-type corrected image generating unit 202 performs the operations starting from Step S602 to Step S614 in a repeated manner for a number of times equal to the number of pixels included in the second-type color image data that is stored in the classified image data storing unit 200G.

The first-type corrected image generating unit 202 selects, as the correction target, a pixel α at a particular pixel position in the second-type color image data; and extracts a color density value K of a pixel in the second-type gloss control image data that has the same pixel position as the pixel position of the pixel α (Step S602). More specifically, of the pixels in the second-type gloss control image data that is stored in the classified image data storing unit 200G, the first-type corrected image generating unit 202 extracts the color density value K of a pixel in the second-type gloss control image data that has the same pixel position as the pixel position of the pixel α.

Subsequently, the first-type corrected image generating unit 202 determines whether or not the color density value K that has been extracted at Step S602 is greater than zero (Step S604). That is, the first-type corrected image generating unit 202 determines whether or not color density value K is greater than zero, that is, whether or not the color density value K is not equal to zero (Step S604). If the color density value K is greater than zero, then the pixel at the pixel position at which the pixel data having the color density value K is held is specified as the pixel to which a gloss effect is to be given.

If the color density value K is equal to zero (No at Step S604), then the system control proceeds to the operation performed subsequent to Step S614 (described later). On the other hand, if the color density value K is greater than zero (Yes at Step S604), then the first-type corrected image generating unit 202 converts the color information represented by the pixel data of the pixel α in the second-type color image data from the RGB color space into the HSV color space (Step S606).

In the HSV color space, a color is expressed with three parameters, namely, the hue, the color saturation, and the value. The hue indicates the type of color (red, green, blue, etc.); the color saturation indicates the vividness of the color; and the value indicates the brightness of the color.

As a known fact, the hue is expressed with a hue circle, which indicates the red color, the green color, the blue color, and the transition in shades of the red color. The unit of the hue is expressed as the angle of rotation with the red color positioned at 0°. Thus, the green color is positioned at 120° and the blue color is positioned at 240°.

As a known fact, the color saturation is expressed as the distance from the center of the hue circle, and has the value in the range from 0 to 1.0. When the color saturation is 1.0, it indicates a pure color. When the color saturation is 0, it indicates the gray color having no vividness whatsoever.

As a known fact, the value is expressed with a value axis that indicates the brightness of a color. The value axis is a straight line joining (R=0, G=0, B=0) to (R=255, G=255, B=255) in the RGB color space. Each value on the value axis has a corresponding center of the hue circle, and the color saturation indicates the distance of that value from the center. The position (angle) on the circumference of the hue circle indicates the type of color.

Meanwhile, since the HSV color space is a commonly known color representing method, further details thereof are not given.

The first-type corrected image generating unit 202 converts the color information represented by the pixel data of the pixel α in the second-type color image data from the RGB color space into the HSV color space using a known calculation formula.

The following explanation is given about the color saturation in particular.

Assume that the pixel α has the RGB values of r, g, and b, respectively. Then, the greatest value of those values is defined as rgbMax using Equation (A) given below and the smallest value of those values is defined as rgbMin using Equation (B) given below.

$$rgb\text{Max}=\max(r,g,b) \quad (A)$$

$$rgb\text{Min}=\min(r,g,b) \quad (B)$$

In this case, a color saturation s of the pixel α can be obtained using Equation (C) given below.

$$s=(rgb\text{Max}-rgb\text{Min})/rgb\text{Max} \quad (C)$$

As described above, the color saturation s can take a value in the range from 0 to 1.0.

For that reason, in each of the gloss control managing table (see FIG. 18), the transparent image managing table (see FIG. 15B), and the gloss highlighting managing table (see FIG. 20) in which the correction information is stored; the two types of color saturation adjustment values, namely, the automatic color saturation adjustment values and the manual color saturation adjustment values are set in the range from 0 to 1.0.

Meanwhile, in the first embodiment, the explanation is given for a case in which there are four types of gloss effect. Accordingly, there are four types of gloss effect specified in the gloss control managing table, the transparent image managing table, and the gloss highlighting managing table. However, it is also possible to divide the gloss effect into a greater number of types.

Moreover, in the first embodiment, as illustrated in FIG. 18, FIG. 15B, and FIG. 20; the automatic color saturation adjustment values specified in the gloss control managing table, the transparent image managing table, and the gloss highlighting managing table are +0.3, +0.15, ±0, −0.15, and −0.3. That is done to ensure that, when the reference color saturation is 0.5, the color saturation for the gloss effect "ultrahigh gloss" becomes equal to 0.8 and the color saturation for the gloss effect "matte" becomes equal to 0.2. However, the automatic color saturation adjustment values are not limited to the abovementioned values.

Particularly, when the type of gloss effect is "matte", the colors indicated by the second-type color image data do not get completely drained. For that reason, the automatic color saturation adjustment value corresponding to "matte" is set so as to ensure that "matte" does not indicate zero color saturation (gray) with respect to the reference color saturation of 0.5.

Returning to the explanation with reference to FIG. 24, the first-type corrected image generating unit 202 obtains a color saturation adjustment value S corresponding to the color density value K extracted at Step S602 (Step S608). More specifically, firstly, the first-type corrected image generating unit 202 reads the gloss control managing table (see FIG. 18), and reads the adjustment method corresponding to a gloss control color density value that is equivalent to the color density value K stored in the gloss control managing table. When the adjustment method is "manual"; the first-type corrected image generating unit 202 obtains, as the color saturation adjustment value S, the manual color saturation adjustment value corresponding to the gloss control color density value. On the other hand, when the adjustment method is "automatic"; the first-type corrected image generating unit 202 obtains, as the color saturation adjustment value S, the automatic color saturation adjustment value corresponding to the gloss control color density value.

For example, assume that the color density value K is equal to 210. In that case, in the gloss control managing table illustrated in FIG. 18, the adjustment method corresponding to the color density value of 210 is "manual". Hence, as the color saturation adjustment value S, the first-type corrected image generating unit 202 reads the manual color saturation adjustment value of +0.225.

Then, the first-type corrected image generating unit 202 calculates the post-correction color saturation of the pixel α by adding the color saturation adjustment value S, which is obtained at Step S608, to the color saturation of the pixel α, which is obtained by performing conversion into the HSV color space at Step S606 (Step S610).

Subsequently, the first-type corrected image generating unit 202 modifies the color saturation specified in the color information of the pixel α, which is subjected to conversion into the HSV color space at Step S606, to the post-correction color saturation of the pixel α calculated at Step S610; and converts the color information in the post-modification HSV color space into the RGB color space (Step S612). Herein, any known conversion equation can be used to convert the HSV color space into the RGB color space.

Then, as the pixel data at the position of the pixel α in the second-type color image data, the first-type corrected image generating unit 202 sets pixel data β containing the information after the conversion performed at Step S612, and stores the pixel data β in the primary memory unit 202A (Step S614).

Subsequently, the first-type corrected image generating unit 202 performs the operations from Step S602 to Step S614 in a repeated manner for a number of times equal to the number of pixels included in the second-type color image data that is stored in the classified image data storing unit 200G. Then, the present routine is terminated.

The first-type corrected image generating unit 202 performs the first-type corrected image generating operation from Step S600 to Step S614 regarding all pixels in the second-type color image data. As a result, the first-type corrected image data gets generated.

In this way, the first-type corrected image generating unit 202 generates the first-type corrected image data in which the color saturation of such pixels in the second-type color image data that correspond to a gloss area indicated by the second-type gloss control image data are corrected depending on the type of gloss effect for that gloss area.

Meanwhile, regarding the second-type clear image data too, the first-type corrected image generating unit 202 performs operations identical to the operations from Step S600 to Step S614. In that case, except for the fact that the second-type gloss control image data is replaced with the second-type clear image data and that the gloss control managing table is replaced with the transparent image managing table, the first-type corrected image generating unit 202 can perform operations identical to the operations from Step S600 to Step S614.

As a result, the first-type corrected image generating unit 202 generates the first-type corrected image data in which the color saturation of such pixels in the second-type color image data that correspond to a gloss area indicated by the second-type gloss control image data are corrected depending on the type of gloss effect for that gloss area, while the color saturation of pixels that correspond to a transparent image indicated by the second-type clear image data are corrected depending on the color density values of that transparent image.

Given below is the explanation regarding the second-type corrected image generating operation performed at Step S414 illustrated in FIG. 22.

Figure 25:
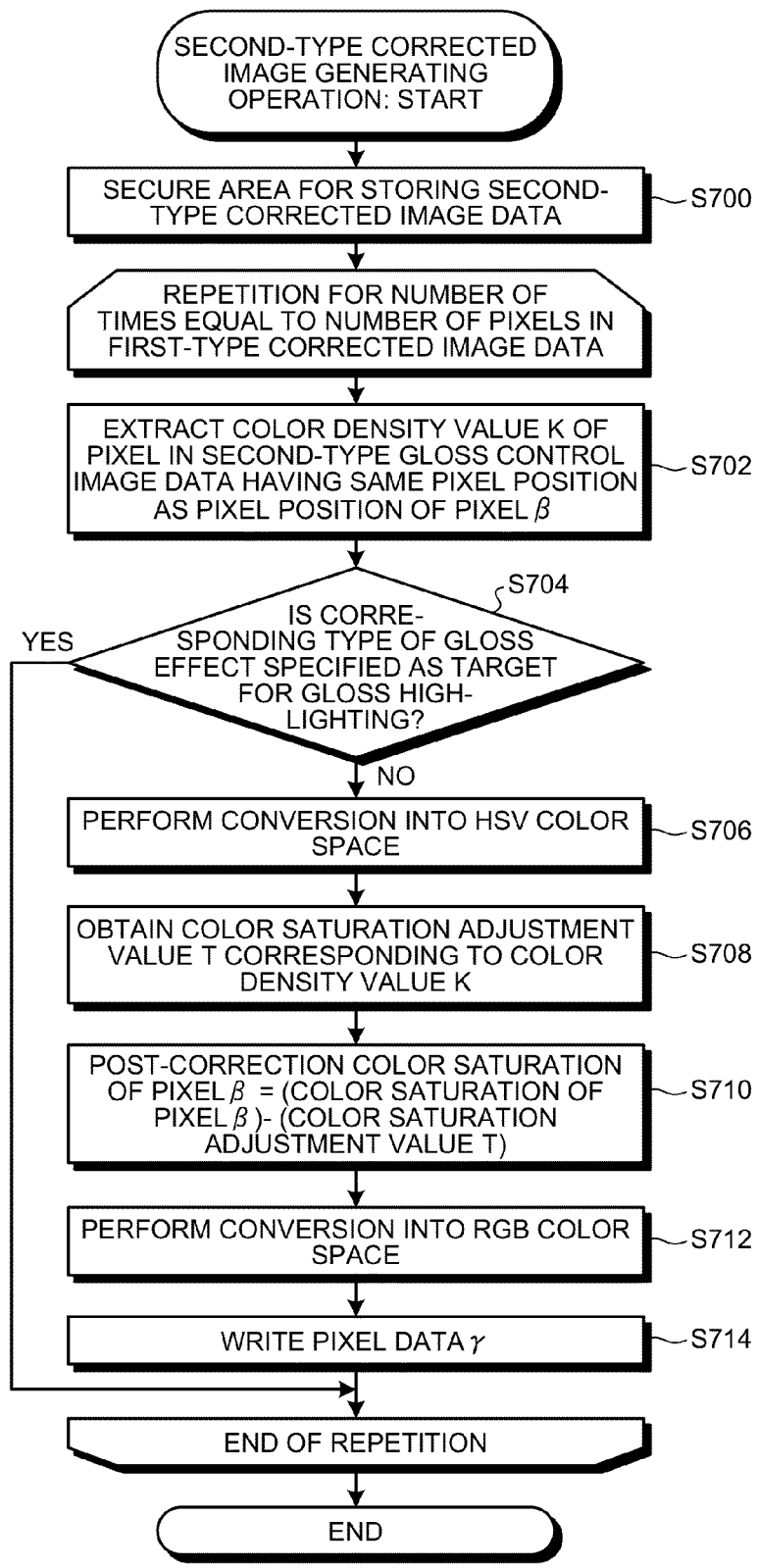
FIG. 25 is a flowchart for explaining a sequence of operations performed during a second-type corrected image generating operation according to the first embodiment.

FIG. 25 is a flowchart for explaining a sequence of operations performed during the second-type corrected image generating operation.

Firstly, the second-type corrected image generating unit 204 secures an area for the purpose of storing each set of pixel data of the second-type corrected image data to be created (Step S700). More particularly, the second-type corrected image generating unit 204 secures the primary memory unit 204A in a RAM for the purpose of storing each set of pixel data of the second-type corrected image data to be created.

Then, the second-type corrected image generating unit 204 performs the operations starting from Step S702 to Step S714 in a repeated manner for a number of times equal to the number of pixels included in the first-type corrected image data that is generated in the manner described above.

The second-type corrected image generating unit 204 selects, as the correction target, a pixel β at a particular pixel position in the first-type corrected image data; and, in an identical manner to Step S602 described earlier, extracts the color density value K of a pixel in the second-type gloss control image data that has the same pixel position as the pixel position of the pixel β (Step S702).

Subsequently, the second-type corrected image generating unit 204 determines whether or not the type of gloss effect corresponding to the color density value K, which has been extracted at Step S702, is specified as the target for gloss highlighting (Step S704).

The determination at Step S704 is performed in the following manner. More specifically, the second-type corrected image generating unit 204 reads the gloss highlighting managing table (see FIG. 20) that is stored in the correction information storing unit 200I, and determines which one of "target" and "non-target" is set as the target setting corresponding to the color density value K extracted at Step S702. If "target" is set as the target setting (Yes at Step S704), then the system control proceeds to Step S714. On the other hand, if "non-target" is set as the target setting (No at Step S704); then the system control proceeds to Step S706.

Subsequently, the second-type corrected image generating unit 204 converts the color information represented by the pixel data of the pixel β in the second-type color image data from the RGB color space into the HSV color space in an identical manner to Step S606 described earlier (Step S706).

Then, the second-type corrected image generating unit 204 obtains a color saturation adjustment value T corresponding to the color density value K extracted at Step S702 (Step S708). More specifically, the second-type corrected image generating unit 204 reads the gloss highlighting managing table (see FIG. 20), and reads the adjustment method corresponding to the gloss control color density value that corresponds to the color density value K stored in the gloss highlighting managing table. When the adjustment method is "manual"; the second-type corrected image generating unit 204 obtains, as the color saturation adjustment value T, the manual color saturation adjustment value corresponding to the gloss control color density value. On the other hand, when the adjustment method is "automatic"; the second-type corrected image generating unit 204 obtains, as the color saturation adjustment value T, the automatic color saturation adjustment value corresponding to the gloss control color density value.

For example, assume that the color density value K is equal to 210. In that case, in the gloss highlighting managing table illustrated in FIG. 20, the adjustment method corresponding to the color density value of 210 is "manual". Hence, the second-type corrected image generating unit 204 reads the manual color saturation adjustment value of +0.3 as the color saturation adjustment value T. Similarly, assume that the color density value K is equal to 200. In that case, in the gloss highlighting managing table illustrated in FIG. 20, the adjustment method corresponding to the color density value of 200 is "automatic". Hence, the second-type corrected image generating unit 204 reads the manual color saturation adjustment value of +0.15 as the color saturation adjustment value T.

Then, the second-type corrected image generating unit 204 calculates the post-correction color saturation of the pixel β by subtracting the color saturation adjustment value T, which is obtained at Step S708, from the color saturation of the pixel β, which is obtained by performing conversion into the HSV color space at Step S706 (Step S710).

Subsequently, the second-type corrected image generating unit 204 modifies the color saturation specified in the color information of the pixel β, which is obtained by performing conversion into the HSV color space at Step S706, to the post-correction color saturation of the pixel β calculated at Step S710; and converts the color information in the post-modification HSV color space into the RGB color space (Step S712). Herein, any known conversion equation can be used to convert the HSV color space into the RGB color space.

Then, as the pixel data at the position of the pixel β in the first-type corrected image data, the second-type corrected image generating unit 204 sets pixel data γ containing the information after the conversion performed at Step S712, and stores the pixel data γ in the primary memory unit 204A (Step S714).

Subsequently, the second-type corrected image generating unit 204 performs the operations from Step S702 to Step S714 in a repeated manner for a number of times equal to the number of pixels included in the first-type corrected image data that is generated as a result of performing the first-type corrected image generating operation at Step S412 (see FIG. 22). Then, the present routine is terminated.

The second-type corrected image generating unit 204 performs the second-type corrected image generating operation from Step S700 to Step S714 regarding all pixels in the first-type corrected image data. As a result, the second-type corrected image data gets generated.

In this way, the second-type corrected image generating unit 204 generates the second-type corrected image data in which the color saturation of such pixels in the first-type corrected image data, which is the second-type color image data that has been corrected depending on the type of gloss effect, that correspond to the area other than the area to be subjected to gloss highlighting are corrected according to the gloss highlighting managing table.

As described above, the display processing unit 15 according to the first embodiment corrects the color saturation of such pixels in the second-type color image data that have the pixel positions specified as a gloss area by the second-type gloss control image data according to the type of gloss effect given to that gloss area. As a result, the display processing unit 15 according to the first embodiment can display a print preview in which the gloss area formed using a transparent developer is displayed without resulting in hiding of the color image.

Moreover, the display processing unit 15 according to the first embodiment corrects the color saturation of such pixels in the second-type color image data that have the pixel positions specified as a transparent image by the second-type clear image data according to the color density value of the transparent image. As a result, the display processing unit 15 according to the first embodiment can display a print preview in which the transparent image formed using a transparent developer is displayed without resulting in hiding of the color image.

Furthermore, in the display processing unit 15 according to the first embodiment, the color saturation adjustment values, which are used in correcting the color saturation according to the type of gloss effect of a gloss area or according to the color density value of a transparent image, can either be set automatically or be set manually by the user.

The automatic color saturation adjustment values, which are the color saturation adjustment values set automatically, are set in such a way that higher the gloss level (i.e., greater the color density values of pixels in the second-type gloss control image data or greater the color density values of pixels in the second-type clear image data), higher is the post-adjustment color saturation. On the contrary, the automatic color saturation adjustment values are set in such a way that lower the gloss level (i.e., smaller the color density values of pixels in the second-type gloss control image data or smaller the color density values of pixels in the second-type clear image data), lower is the post-adjustment color saturation.

For that reason, it becomes possible to correct the color saturation according to the type of gloss effect or according to the color density value of a transparent image.

Moreover, since the color saturation adjustment values can be set manually according to the user instructions, it becomes possible to arbitrarily adjust the color saturation of such pixels in the second-type color image data that have the pixel positions specified as a gloss area by the second-type gloss control image data or to arbitrarily adjust the color saturation of such pixels in the second-type color image data that have the pixel positions specified as a transparent image by the second-type clear image data.

Furthermore, the display processing unit 15 according to the first embodiment adjusts the color saturation of pixels in the first-type corrected image data that correspond to the color density values (i.e., the types of gloss effect) of pixels in the area other than a gloss area corresponding to the type of gloss effect to be subjected to gloss highlighting.

For that reason, it becomes possible to increase the color saturation difference between a gloss area corresponding to the type of gloss effect to be subjected to gloss highlighting and the area other than that gloss area. Hence, a gloss area that is specified as the area to which a gloss effect is to be given can be displayed in a highlighted manner in the print preview.

<Explanation about DFE 30, MIC 40, and Printing Device 60>

Returning to the explanation with reference to FIG. 1, the following explanation is given about the DFE 30, the MIC 40, and the printing device 60.

The DFE 30 receives print data from the host device 11 and, based on that print data, generates image data that is to be used in forming toner images according to the toners of each color of CMYK and the clear toner that is colorless (having a transparent color). Then, the DFE 30 sends the image data to a printer 50 and a post-processing device 75 via the MIC 40.

The printer 50 at least includes the toners of each color of CMYK and the clear toner, as well as has an imaging unit and an exposing device mounted thereon corresponding to each toner. Each imaging unit includes a photosensitive member, a charging device, a developing device, and a photosensitive member cleaner. In the printer 50; according to the image data received from the DFE 30 via the MIC 40, the exposing device emits an optical beam so that a toner image of each toner is formed on the corresponding photosensitive member. Then, the toner images are transferred onto a recording medium such as a recording paper. Subsequently, at a temperature within a predetermined range (i.e., at the normal temperature), a fixing device (not illustrated) applies heat and pressure so that the toner images are fixed on the recording paper. As a result, an image gets formed on the recording paper (details given later).

In the example illustrated in FIG. 1, the post-processing device 75 includes a glosser 70 that is connected to the printer 50, a normal-fixing post-processing device 80 that is connected to the glosser 70, and a low-temperature-fixing post-processing device 90 that is connected to the normal-fixing post-processing device 80. The control of switching ON or switching OFF the glosser 70 is performed by the DFE 30. When switched ON, the glosser 70 performs re-fixes an image that has been formed on a recording paper by the printer 50; cools the re-fixed image; and separates the recording paper having the image formed thereon from the main body. As a result, in the entire image formed on the recording paper, the pixels to which the toner of a predetermined amount or more is attached, the total amount of attached toner to each pixel is uniformly compressed.

The normal-fixing post-processing device 80 includes an imaging unit having a photosensitive member for the clear toner, a charging device, a developing device, and a photosensitive member cleaner; includes an exposing device; and includes a fixing device for fixing the clear toner. The normal-fixing post-processing device 80 receives input of clear toner image data (described later) that is generated by the DFE 30. The normal-fixing post-processing device 80 refers to the clear toner image data and forms a toner image of the clear toner in a superimposed manner on the image that has been formed on the recording medium as a result of application of pressure by the glosser 70. Then, at the normal temperature, the fixing device applies heat and pressure to the toner image formed on recording medium so that the toner image gets fixed on the recording medium.

The low-temperature-fixing post-processing device 90 includes an imaging unit having a photosensitive member for the clear toner, a charging device, a developing device, and a photosensitive member cleaner; includes an exposing device; and includes a fixing device for fixing the clear toner. The low-temperature-fixing post-processing device 90 receives input of clear toner image data (described later) that is generated by the DFE 30. The low-temperature-fixing post-processing device 90 refers to the clear toner image data and forms a toner image of the clear toner in a superimposed manner on the image that has been formed on the recording medium as a result of application of pressure by the glosser 70 and the normal-fixing post-processing device 80. Then, at a lower temperature than the normal temperature (i.e., at a low temperature), the fixing device applies heat and pressure to the toner image formed on recording medium so that the toner image gets fixed on the recording medium.

Given below is the explanation about a functional configuration of the DFE 30. FIG. 26 is a block diagram illustrating an overall configuration example of the DFE 30. As illustrated in FIG. 26, the DFE 30 includes an I/F unit 31, an I/F unit 32, and a control unit 35. The I/F unit 31 is an interface that enables communication with the host device 11. The I/F unit 32 is an interface that enables communication with the MIC 40.

The control unit 35 is a computer that controls the DFE 30 in entirety and that includes a CPU, a ROM, and a RAM. As illustrated in FIG. 26, the control unit has the following functions: a rendering engine 101, an si1 unit 102, a toner reproduction curve (TRC) 103, an si2 unit 104, a halftone engine 105, a clear processing 108, an si3 unit 106, and a surface effect selection table (not illustrated). The rendering engine 101, the si1 unit 102, the TRC 103, the si2 unit 104, the halftone engine 105, the clear processing 108, and the si3 unit 106 are implemented when the control unit 35 of the DFE 30 executes various programs stored in a main memory unit or an auxiliary memory unit. Each of the si1 unit 102, the si2 unit 104, and the si3 unit 106 has the function of separating image data and the function of integrating image data. The surface effect selection table is stored in, for example, an auxiliary memory unit.

The rendering engine 101 receives input of print data from the host device 11. Then, the rendering engine 101 performs language interpretation with respect to the received print data; converts each of the first-type color image data in the vector format, the first-type clear image data in the vector format, and the first-type gloss control image data in the vector format into image data expressed in the raster format; converts the color space expressed in the RGB format into a color space in the CMYK format; and outputs fourth-type color image data in the CMYK format, fourth-type gloss control image data in the CMYK format, and fourth-type clear image data in the CMYK format. Each of the fourth-type color image data, the fourth-type gloss control image data, and the fourth-type clear image data is image data in which a single pixel is expressed with, for example, eight bits. The fourth-type clear image data and the fourth-type gloss control image data is expressed with, for example, eight bits for a single pixel and with density values in the range from "0" to "255" (or in the range from 0% to 98%). Thus, each of the first-type color image data in the vector format, the first-type clear image data in the vector format, and the first-type gloss control image data in the vector format that is included in the print data output by the host device 11 is converted by the rendering engine 101 into image data expressed in the raster format. As a result, the DFE 30 sets the types of surface effect for the user-specified drawing area in the form of color density values with pixels serving as the units.

The si1 unit 102 outputs the fourth-type color image data to the TRC 103. Moreover, the si1 unit 102 outputs fourth-type gloss control image data and the fourth-type clear image data to the clear processing 108.

Thus, the TRC 103 receives input of the fourth-type color image data from the si1 unit 102. With respect to the fourth-type color image data, the TRC 103 performs gamma correction using a gamma curve of 1D_LUT that is generated by means of calibration. As far as the image processing is concerned, apart from the gamma correction, total volume control of the toner can also be performed. However, in the first embodiment, the total volume control of the toner is omitted. The si2 unit 104 outputs the fourth-type color image data that has been subjected to gamma correction by the TRC 103 to the clear processing 108 as the data to be used to generate an inverse mask. The halftone engine 105 receives input of the post-gamma-correction fourth-type color image data via the si2 unit 104. In order to perform an output to the printing device 60, the halftone engine 105 performs halftone processing in which the fourth-type color image data is converted into, for example, a data format of image data having two bits of each color of CMYK; and outputs fifth-type color image data, as the image data having two bits of each color of CMYK after halftone processing, to the si3 unit 106. Herein, the image data having two bits is only an example, and it is not the only possible case.

The clear processing 108 refers to the surface effect selection table corresponding to surface information and device configuration; determines whether to switch ON or switch OFF the glosser 70; and generates two-bit clear toner image data (two-bit clear toner plane data) having, for example, two bits (described later) that is used to attach the clear toner using the fourth-type gloss control image data and the fourth-type clear image data. Herein, the image data having two bits is only an example, and it is not the only possible case.

More specifically, in the surface effect selection table, the following information is stored in a corresponding manner: color density values of the gloss control color image data that are expressed in the range from "0%" to "98%"; color density values of the gloss control color image data that are expressed in 256 stages from "0" to "255"; types of surface effect; ON/OFF information that specifies whether the glosser 70 is to be switched ON or switched OFF; determination method of color density values of the clear toner image data; and types of implementable surface effect. The surface effect selection table is set in a corresponding manner to device configuration information as well as to information indicating whether the glosser 70 is to be switched ON or switched OFF.

FIG. 27 is a diagram illustrating an example of the surface effect selection table. The contents of the surface effect selection table are determined according to device configuration information and priority information. The device configuration information indicates the configuration of the post-processing device 75 that is installed in the printing device 60. The priority information indicates either one of "gloss priority" and "type priority". Herein, "gloss priority" indicates that the user-specified surface effect is substituted with a surface effect of a higher gloss level; while "type priority" indicates that the user-specified surface effect is substituted with a surface effect not including "ultrahigh gloss" that has the highest gloss level.

The clear processing 108 reads the surface effect selection table, which corresponds to the device configuration information and the priority information, from a memory unit (not illustrated). For example, the clear processing 108 reads the surface effect selection table as illustrated in FIG. 27. Herein, the priority information indicates either one of "gloss priority" and "type priority", and is specified by a user operation. The device configuration information indicates the type of the post-processing device 75 that is installed in the printing device 60.

When the priority information indicates "gloss priority", the clear processing 108 determines that the glosser 70 is switched ON. On the other hand, when the priority information indicates "type priority", the clear processing 108 determines that the glosser 70 is switched OFF.

Then, regarding the pixel at each pixel position, the clear processing 108 converts the 8-bit pixel data into, for example, 2-bit pixel data. More specifically, if a transparent image and a gloss area to which a surface effect is to be given overlap at a target pixel for conversion, then the clear processing 108 excludes either the transparent image or the gloss area according to the priority setting done separately in advance.

More particularly, regarding a pixel position at which a transparent image and a gloss area overlap, if the priority setting indicates "gloss priority" (sometimes referred to as "clear priority"), then the 8-bit pixel data at the pixel position corresponding to the fourth-type clear image data is converted into 2-bit pixel data. In contrast, regarding a pixel position at which a transparent image and a gloss area overlap, if the priority setting indicates "type priority", then the 8-bit pixel data at the pixel position corresponding to the fourth-type gloss control image data is converted into 2-bit pixel data.

Then, the clear processing 108 refers to the surface effect selection table corresponding to the ON/OFF setting of the glosser 70 and the device configuration information determined according to the priority information; and generates 2-bit first-type clear toner image data Clr-1, 2-bit second-type clear toner image data Clr-2, and 2-bit third-type clear toner image data Clr-3 from the fourth-type gloss control image data and the fourth-type clear toner data.

The first-type clear toner image data Clr-1 is used when the printer 50 performs printing with the use of the clear toner. The second-type clear toner image data Clr-2 is used when the normal-fixing post-processing device 80 performs printing with the use of the clear toner. The third-type clear toner image data Clr-3 is used when the low-temperature-fixing post-processing device 90 performs printing with the use of the clear toner.

Subsequently, to the si3 unit 106, the clear processing 108 outputs ON/OFF instruction information, which specifies whether the glosser 70 is to be switched ON or switched OFF, and the sets of 2-bit clear toner image data (Clr-1 to Clr-3).

In the example illustrated in FIG. 27, when the pixels included in the fourth-type gloss control image data have the color density values in the range from "205" to "255" (i.e., in the range from 94% to 98%), the type of surface effect corresponding to those color density values of pixels is set to "ultrahigh gloss" and the ON/OFF information is set to "ON". When "ultrahigh gloss" is set, the image data input to the first-type clear toner image data Clr-1 is "inverse mask 1" and the image data input to the second-type clear toner image data Clr-2 as well as to the third-type clear toner image data Clr-3 is "no data".

Similarly, when the pixels included in the fourth-type gloss control image data have the color density values in the range from "154" to "204" (i.e., in the range from 84% to 90%), the type of surface effect corresponding to those color density values of pixels is set to "high gloss" and the ON/OFF information is set to "ON". When the surface effect is set to "high gloss"; the image data input to the first-type clear toner image data Clr-1 is "inverse mask m", the image data input to the second-type clear toner image data Clr-2 is "solid", and the image data input to the third-type clear toner image data Clr-3 is "no data".

Similarly, when the pixels included in the fourth-type gloss control image data have the color density values in the range from "52" to "102" (i.e., in the range from 10% to 16%), the type of surface effect corresponding to those color density values of pixels is set to "low gloss" and the ON/OFF information is set to "ON". When "low gloss" is set, the image data input to the first-type clear toner image data Clr-1 as well as to the third-type clear toner image data Clr-3 is "no data".

However, when "low gloss" is set, the image data input to the second-type clear toner image data Clr-2 is "halftone-n".

When the pixels included in the fourth-type gloss control image data have the color density values in the range from "1" to "51" (i.e., in the range from 0% to 6%), the type of surface effect corresponding to those color density values of pixels is set to "matte" and the ON/OFF information is set to "ON". When "matte" is set, the image data input to the first-type clear toner image data Clr-1 as well as to the second-type clear toner image data Clr-2 is "no data".

However, when "matte" is set, the image data input to the third-type clear toner image data Clr-3 is "solid".

Herein, the inverse mask is used to ensure that the total amount of attached toner, which is the total of the CMYK toners and the clear toner, is uniform on each pixel that constitutes an area to which a surface effect is to be given. More particularly, the inverse mask is the image data obtained by adding all color density values of the pixels constituting a target area in CMYK image data and then subtracting the added value from a predetermined value. More particularly, for example, the inverse mask is expressed using Equation (1) given below.

$$Clr = 100 - (C + M + Y + K) \qquad (1)$$

(where, when Clr<0, Clr=0)

In Equation (1); each of Clr, C, M, Y, and K represents a color density rate that is reduced from the color density value of each pixel regarding the clear toner, the cyan toner, the magenta toner, the yellow toner, and the black toner, respectively. Thus, for all pixels constituting the area to which a surface effect is to be given, the total amount of attached toner is 100% that is obtained by adding the amount of clear toner to the total amount of CMYK toners. Meanwhile, when the total amount of CMYK toners is equal to or greater than 100%, the clear toner is not attached and the color density rate thereof becomes %0. That is because of the fact that the portion having the total amount CMYK toners exceeding 100% is subjected to smoothing by means of a fixing operation. In this way, by ensuring that, in the area to which a surface effect is to be given, the total amount of attached toner on all pixels is equal to or greater than 100%; it becomes possible to eliminate the unevenness on the surface that may be caused due to the difference in the total amount attached toner in that area. As a result, the regular reflection of light leads to the appearance of gloss. Meanwhile, the inverse mask can also be obtained using equations other than Equation (1). Thus, there can be a plurality of types of the inverse mask. In the following explanation, INV-1 and INV-m represent such types of the inverse mask.

A solid mask is used to ensure that the clear toner is uniformly attached to each pixel constituting the area to which a surface effect is to be given. More particularly, for example, the solid mask is expressed using Equation (2) given below.

$$Clr = 100 \qquad (2)$$

Meanwhile, it is also possible to have a case in which, of the pixels to which a surface effect is to be given, some pixels are associated with the color density rate other than 100%. Thus, there can be a plurality of patterns of the solid mask.

Moreover, for example, the inverse mask can also be obtained by the multiplication of the background exposure rate of each color. In this case, for example, the inverse mask can be expressed using Equation (3) given below.

$$Clr = 100 \times \{(100-C)/100\} \times \{(100-M)/100\} \times \{(100-Y)/100\} \times \{(100-K)/100\} \qquad (3)$$

In Equation (3), "(100−C)/100" represents the background exposure rate of cyan, "(100−M)/100" represents the background exposure rate of magenta, "(100−Y)/100" represents the background exposure rate of yellow, and "(100−K)/100" represents the background exposure rate of black.

Furthermore, for example, the inverse mask can also be obtained by a method in which it is assumed that the halftone dots of the maximum area ratio regulate the smoothness. In this case, for example, the inverse mask is expressed using Equation (4) given below.

$$Clr = 100 - \max(C, M, Y, K) \qquad (4)$$

In Equation (4), max(C, M, Y, K) indicates that, of the color density values of CMYK colors, the maximum color density value is the representative value.

To sum up, the inverse mask can be expressed using any one of Equation (1) to Equation (4).

In the example illustrated in FIG. 27, when the pixels included in the fourth-type gloss control image data have the color density values in the range from "154" to "204" (i.e., in the range from 84% to 90%); it is illustrated that the type of surface effect corresponding to those color density values of pixels is set to "high gloss", it is illustrated that the ON/OFF information is set to "ON", it is illustrated that the color density values of those pixels in the first-type clear toner image data Clr-1 are obtained using "inverse mask m" and are expressed with eight bits, it is illustrated that the color density values of those pixels in the second-type clear toner image data Clr-2 are obtained using "solid" and are expressed with two bits, it is illustrated that the color density values of those pixels in the third-type clear toner image data Clr-3 are absent ("no data"), and it is illustrated that the type of implementable surface effect is "high gloss". The "inverse mask m" is expressed using an equation other than Equation (1) (i.e., expressed using any one of Equation (2) to Equation (4)). That is because of the fact that the total amount of attached toner that is subjected to smoothing is different than that for "ultrahigh gloss". Meanwhile, "solid" is used to ensure that the clear toner is uniformly attached to each pixel constituting the area to which a surface effect is to be given. More particularly, for example, "solid" is expressed using Equation (2). Moreover, it is also possible to have a case in which, of the pixels to which a surface effect is to be given, some pixels are associated with the color density rate other than 100%. Thus, there can be a plurality of patterns of "solid".

In the example illustrated in FIG. 27, when the pixels included in the fourth-type gloss control image data have the color density values in the range from "52" to "102" (i.e., in the range from 10% to 16%); it is illustrated that the type of surface effect corresponding to those color density values of pixels is set to "low gloss", it is illustrated that the ON/OFF information is set to "ON", it is illustrated that the color density values of those pixels in the first-type clear toner image data Clr-1 are absent ("no data"), it is illustrated that the color density values of those pixels in the second-type clear toner image data Clr-2 are obtained using "halftone-n" and are expressed with two bits, it is illustrated that the color density values of those pixels in the third-type clear toner image data Clr-3 are absent ("no data"), and it is illustrated that the type of implementable surface effect is "low gloss". Meanwhile, halftone is used to reduce the gloss level by performing a halftone process on the clear toner so as to give unevenness to the surface with the aim of causing diffused reflection. There are many types of the halftone process, and "halftone-n" is used as an expression to indicate one of those types. In the first embodiment, when "low gloss" is specified as the type of surface effect, each pixel within the area for which "low gloss" is specified in the gloss control image data is set to have the same color density value in the range from "52" to "102".

In the example illustrated in FIG. 27, when the pixels included in the fourth-type gloss control image data have the color density values in the range from "1" to "51" (i.e., in the range from 0% to 6); it is illustrated that the type of surface effect corresponding to those color density values of pixels is set to "matte", it is illustrated that the ON/OFF information is set to "ON", it is illustrated that the color density values of those pixels in the first-type clear toner image data Clr-1 as well as in the second-type clear toner image data Clr-2 are absent ("no data"), it is illustrated that the color density values of those pixels in the third-type clear toner image data Clr-3 are obtained using "solid" and are expressed with two bits, and it is illustrated that the type of implementable surface effect is "matte".

In the first embodiment, depending on whether "gloss priority" is set or "type priority" is set, the clear processing 108 refers to the surface effect selection table illustrated in FIG. 27 and determines whether to switch ON or switch OFF the glosser 70. Moreover, the clear processing 108 refers to the determined state of the glosser 70 and to the surface effect selection table corresponding to the ON/OFF state of the glosser 70 and the device configuration; makes use of the fourth-type gloss control image data that has been input; and generates 8-bit first-type clear toner image data Clr-1, generates 2-bit second-type clear toner image data Clr-2, and generates 2-bit third-type clear toner image data Clr-3. Then, the clear processing 108 performs a halftone process on the 8-bit first-type clear toner image data Clr-1 and converts it into 2-bit first-type clear toner image data Clr-1. Subsequently, to the si3 unit 106, the clear processing 108 outputs the ON/OFF instruction information, which specifies whether the glosser 70 is to be switched ON or switched OFF, and the sets of 2-bit clear toner image data (Clr-1 to Clr-3).

The si3 unit 106 integrates the fifth-type color image data, which is the image data having two bits of each color of CMYK after halftone processing (2 bits×4 planes), with sets of 2-bit clear toner image data (Clr-1 to Clr-3) (2 bits×3 planes); and outputs the integrated image data to the MIC 40. In addition, the si3 unit 106 outputs the ON/OFF instruction information, which is received from the clear processing 108, to the MIC 40. In the first embodiment, for example, if each of "ultrahigh gloss", "high gloss", "low gloss", and "matte" is specified in a single page; then seven sets of 2-bit image data (CMYK+(Clr-1)+(Clr-2)+(Clr-3)) and the ON/OFF instruction information indicating the ON state of the glosser 70 are output from the DFE 30 to the MIC 40.

The MIC 40 is connected to the DFE 30 and the printer 50; receives the fifth-type color image data of CMYK (2 bits×4 planes) as well as receives the first-type clear toner image data to the third-type clear toner image data from the DFE 30; and assigns each set of image data to a corresponding device as well as controls the post-processing device.

Figure 28:
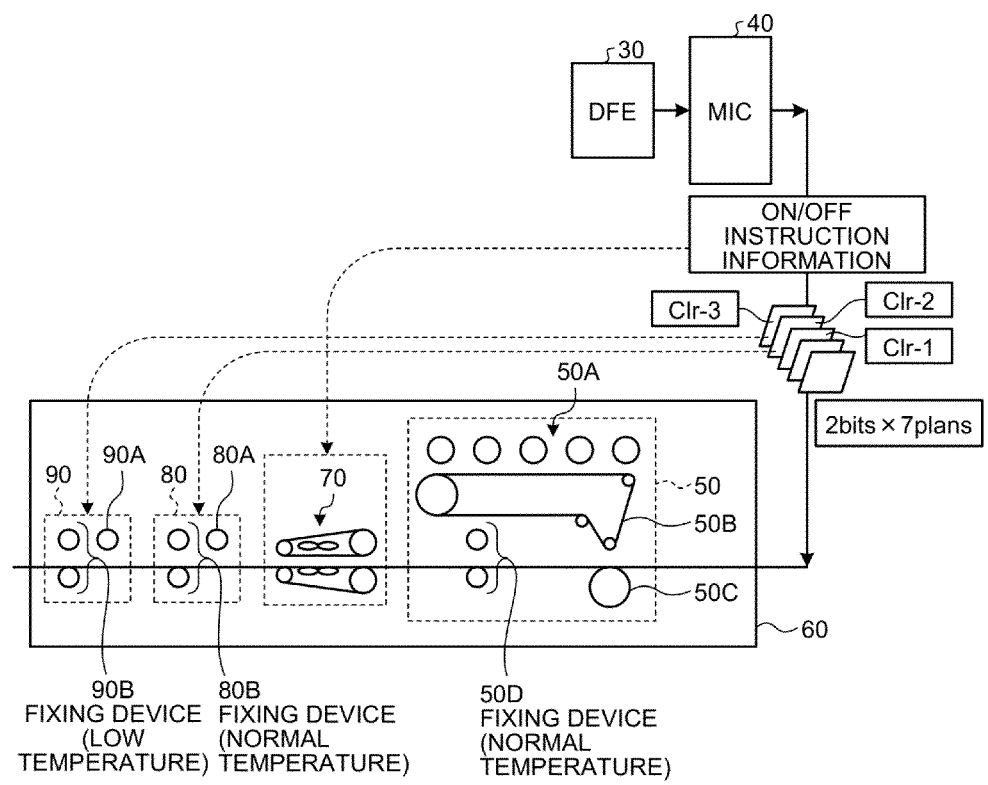
FIG. 28 is a schematic view of a printing device according to the first embodiment.

In this case, as illustrated in FIG. 28, the DFE 30 outputs the fifth-type color image data of CMYK (2 bits×4 planes) as well as the first-type clear toner image data Clr-1 to the printer 50 via the MIC 40. Moreover, the DFE 30 outputs the ON/OFF instruction information indicating the ON state to the glosser 70 via the MIC 40. Upon receiving the ON/OFF information, the glosser 70 switches to the ON state. Furthermore, the DFE 30 outputs the second-type clear toner image data Clr-2 to the normal-fixing post-processing device 80 via the MIC 40, and outputs the third-type clear toner image data to the low-temperature-fixing post-processing device 90 via the MIC 40.

In the example illustrated in FIG. 28, the printer 50 refers to the fifth-type color image data of CMYK (2 bits×4 planes) as well as refers to the first-type clear toner image data Clr-1; emits an optical beam from the exposing device so that a toner image of each toner is formed on the corresponding photosensitive member; transfers the toner images onto a recording medium; and fixes the toner images on the recording medium.

More specifically, the printer 50 includes a plurality of electrophotographic photosensitive members 50A; a transfer belt 50B onto which are transferred the toner images formed on the photosensitive members 50A; a transfer device 50C that transfers the toner images from the transfer belt 50B onto a recording medium; and a fixing device 50D that fixes the toners images, which have been transferred onto the recording medium, on the recording medium.

As a result, the toners of each color of CMYK and the clear toner get attached to the recording medium thereby resulting in the formation of an image. Then, the recording medium is carried along a carrying path to the position of the glosser 70 that has switched to the ON state. Subsequently, the glosser 70 applies heat of a high temperature and pressure of a high level to the recording medium (i.e., to the area on the recording medium in which the image is formed by the printer 50).

The normal-fixing post-processing device 80 refers to the second-type clear toner image data that is output by the MIC 40; accordingly forms a toner image using the clear toner; superimposes that toner image on the recording medium that has already passed through the glosser 70; and applies heat and pressure at the normal temperature so that the toner image gets fixed on the recording medium. Subsequently, the low-temperature-fixing post-processing device 90 refers to the third-type clear toner image data Clr-3 that is output by the MIC 40; accordingly forms a toner image using the clear toner; superimposes that toner image on the recording medium that has already passed through the normal-fixing post-processing device 80; and applies heat and pressure at a low temperature so that the toner image gets fixed on the recording medium.

More specifically, the normal-fixing post-processing device 80 includes a fixing device 80B that fixes toner images, which have been transferred onto the recording medium from an electrophotographic photosensitive member 80A, on the recording medium. Similarly, the low-temperature-fixing post-processing device 90 includes a fixing device 90B that fixes toner images, which have been transferred onto the recording medium from an electrophotographic photosensitive member 90A, on the recording medium. Herein, a carrying member (not illustrated) carries the recording medium to the positions in the printer 50, the glosser 70, the normal-fixing post-processing device 80, and the low-temperature-fixing post-processing device 90 in that order. There, each of those constituent elements sequentially performs processing on the recording medium so that an image is formed on the recording medium and a surface effect is given to that image. Then, a carrying mechanism (not illustrated) carries the recording medium and discharges it to the outside of the printing device 60.

In this way, a transparent image is formed on the recording medium with the use of the clear toner. Moreover, in the area that has been specified as an ultrahigh gloss area by the user, the gloss effect "ultrahigh gloss" appears. Similarly, in the area that has been specified as a high gloss area by the user, the gloss effect "high gloss" appears. Moreover, in the area that has been specified as a low gloss area by the user, the gloss effect "low gloss" appears. Furthermore, in the area that has been specified as a matte area by the user, the gloss effect "matte" appears. Meanwhile, in the area for which no surface effect is specified, none of the surface effects is given.

Herein, although the invention is described with reference to the abovementioned embodiments for a complete and clear disclosure, the appended claims are not to be thus limited but are to be construed as embodying all modifications and alternative constructions that may occur to one skilled in the art that fairly fall within the basic teaching herein set forth.

For example, in the first embodiment described above, the display processing unit 15 is installed in the host device 11. However, alternatively, the display processing unit 15 can be installed in the DFE 30.

Moreover, in the first embodiment, the clear toner is used for the printing of transparent images or for giving surface effects. However, instead of using a toner, any color material containing a transparent developer can be used. For example, instead of the clear toner, a transparent developing liquid can be used.

Furthermore, in the first embodiment, the printer 50 forms images using toners of a plurality of colors of CMYK. However, alternatively, it is also possible to form images using the toner of a single color.

Second Embodiment

In the first embodiment, print previews (display images) are generated in the host device 11. However, that is not the only possible case.

That is, alternatively, the configuration can be such that some of the plurality of operations performed in a first device can be performed in one or more of other devices that are connected to that first device via a network.

As an example, in an image forming system according to a second embodiment, some of the functions of a host device are implemented in a server device that is installed on a network.

Figure 29:
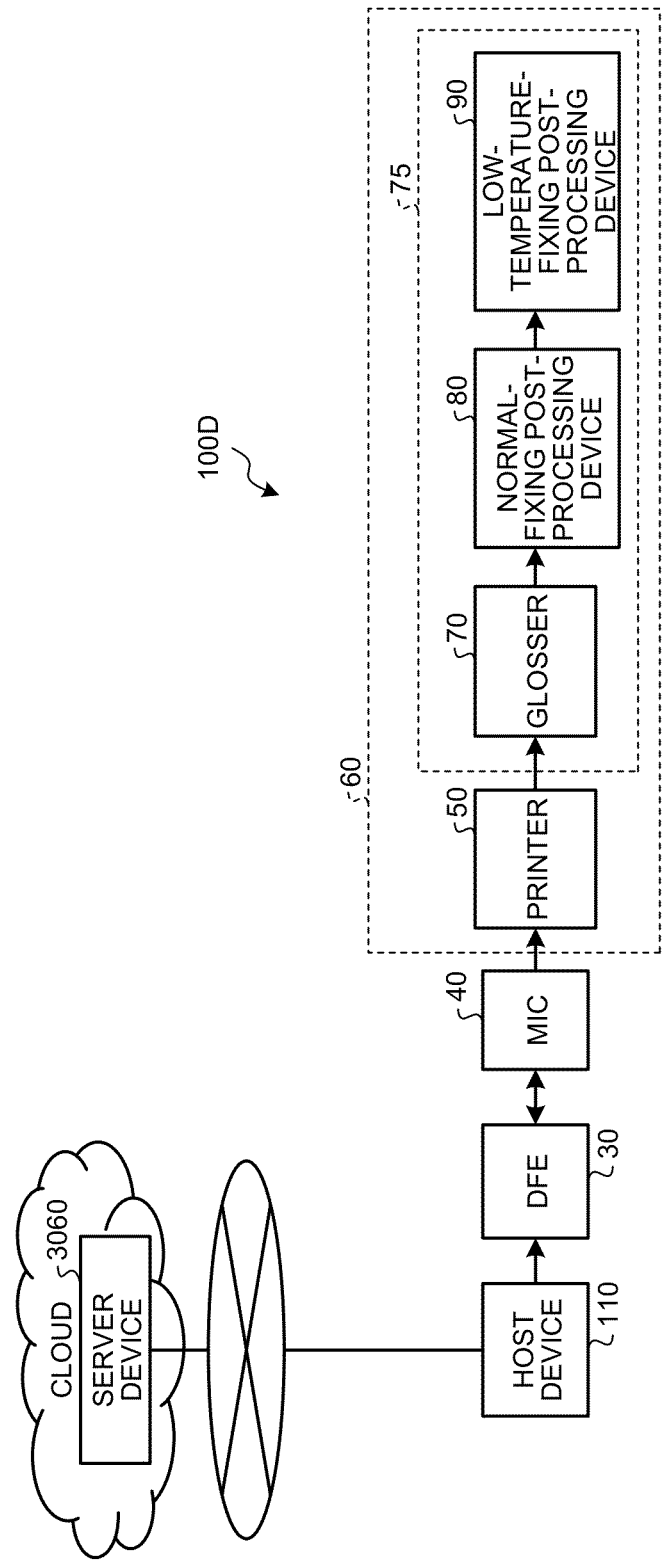
FIG. 29 is a diagram illustrating an exemplary configuration of an image forming system according to a second embodiment.

FIG. 29 is a diagram illustrating an exemplary configuration of the image forming system according to the second embodiment. As illustrated in FIG. 29, an image forming system 100D according to the second embodiment includes a host device 110, the DFE 30, the MIC 40, and the printing device 60.

In the second embodiment, the host device 110 is connected to a server device 3060 via a network such as the Internet. Moreover, in the second embodiment, the analyzing unit 200L, the classified image data generating unit 200F, and the display image generating unit 200H that are installed in the host device 11 according to the first embodiment are installed in the server device 3060.

Herein, the host device 110, the DFE 30, the MIC 40, and the printing device 60 have the same configuration as described in the first embodiment.

More particularly, in the second embodiment, the host device 110 is connected to a single server device 3060 via a network (cloud) such as the Internet. The server device 3060 includes the functions such as the analyzing unit 200L, the classified image data generating unit 200F, and the display image generating unit 200H of the first embodiment. With such a configuration, the operation of generating display images is performed in the server device 3060.

Figure 30:
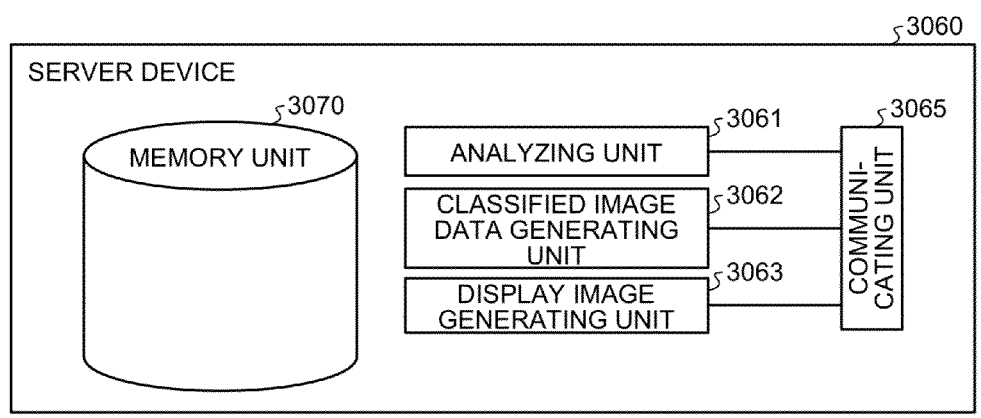
FIG. 30 is a block diagram illustrating a functional configuration of a server device according to the second embodiment.

Firstly, the explanation is given about the server device 3060. FIG. 30 is a block diagram illustrating a functional configuration of the server device 3060 according to the second embodiment. The server device 3060 mainly includes a memory unit 3070, an analyzing unit 3061, a classified image data generating unit 3062, a display image generating unit 3063, and a communicating unit 3065.

The communicating unit 3065 performs communication of a variety of data and various requests with the host device 110. More particularly, from the host device 110, the communicating unit 3065 receives first-type data that contains original data as well as contains correction information that is stored in a gloss control managing table and a transparent image managing table. Moreover, the communicating unit 3065 sends display images, which are generated by the display image generating unit 3063, to the host device 110.

The analyzing unit 3061, the classified image data generating unit 3062, and the display image generating unit 3063 have the same functions as the functions of the analyzing unit 200L, the classified image data generating unit 200F, and the display image generating unit 200H, respectively, described in the first embodiment.

The memory unit 3070 is a memory medium such as an HDD or a memory that is used to store an object structure list as well as to store second-type color image data, second-type gloss control image data, and second-type clear image data generated by the classified image data generating unit 3062. Moreover, the memory unit 3070 is also used to store an object classification list obtained by means of classification performed by the analyzing unit 200L, as well as to store the first-type data received by the communicating unit 3065.

The following explanation is given about the host device 110.

Figure 31:
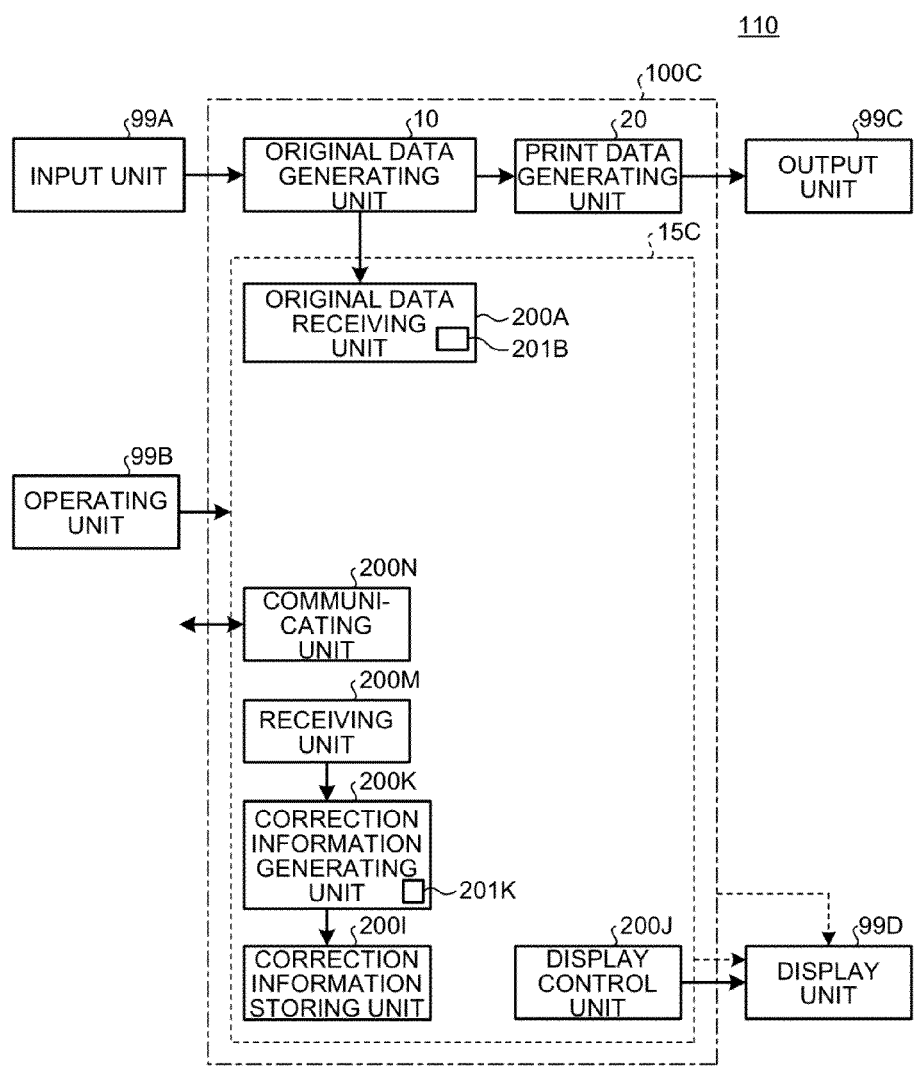
FIG. 31 is a functional block diagram of a host device according to the second embodiment.

FIG. 31 is a functional block diagram of the host device 110. Herein, the host device 110 includes the display unit 99D, the input unit 99A, the operating unit 99B, and a control unit 99C. Moreover, the control unit 99C further includes the original data generating unit 10, the print data generating unit 20, and a display processing unit 15C.

The original data generating unit 10 and the print data generating unit 20 are identical to those described in the first embodiment.

The display processing unit 15C includes the original data receiving unit 200A, a communicating unit 200N, the receiving unit 200M, the correction information generating unit 200K, the correction information storing unit 200I, and the display control unit 200J. Herein, the original data receiving unit 200A, the receiving unit 200M, the correction information generating unit 200K, the correction information storing unit 200I, and the display control unit 200J are identical to those described in the first embodiment.

The communicating unit 200N sends the first-type data to the host device 110 and receives display images from the host device 110.

The following explanation is given regarding an image displaying operation performed by the display processing unit 15C of the host device 110 according to the second embodiment.

Figure 32:
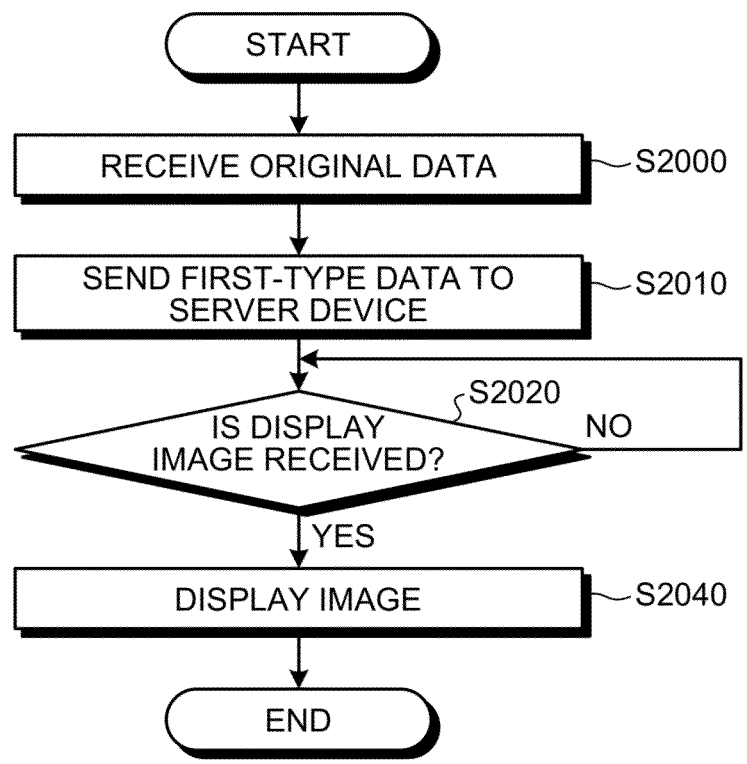
FIG. 32 is a flowchart for explaining a sequence of operations performed during an image displaying operation by a display processing unit of the host device according to the second embodiment.

FIG. 32 is a flowchart for explaining a sequence of operations performed during an image displaying operation by the display processing unit 15C of the host device 110 according to the second embodiment.

Firstly, the original data receiving unit 200A receives original data (Step S2000). The original data received by the original data receiving unit 200A is expanded in the primary memory 201B.

Then, the communicating unit 200N sends the first-type data, which contains the original data that is received at Step S2000 and contains the correction information that is stored in the gloss control managing table and the transparent image managing table, to the server device 3060 (Step S2010).

Subsequently, until a display image is received from the server device 3060 (No at Step S2020), the communicating unit 200N repeats determining whether or not a display image is received. When a display image is received from the server device 3060 (Yes at Step S2020), the system control proceeds to Step S2040.

Then, the display control unit 200J performs control to display the display image, which is received at Step S2020, on the display unit 99D (Step S2040). Subsequently, the present routine is terminated.

Figure 33:
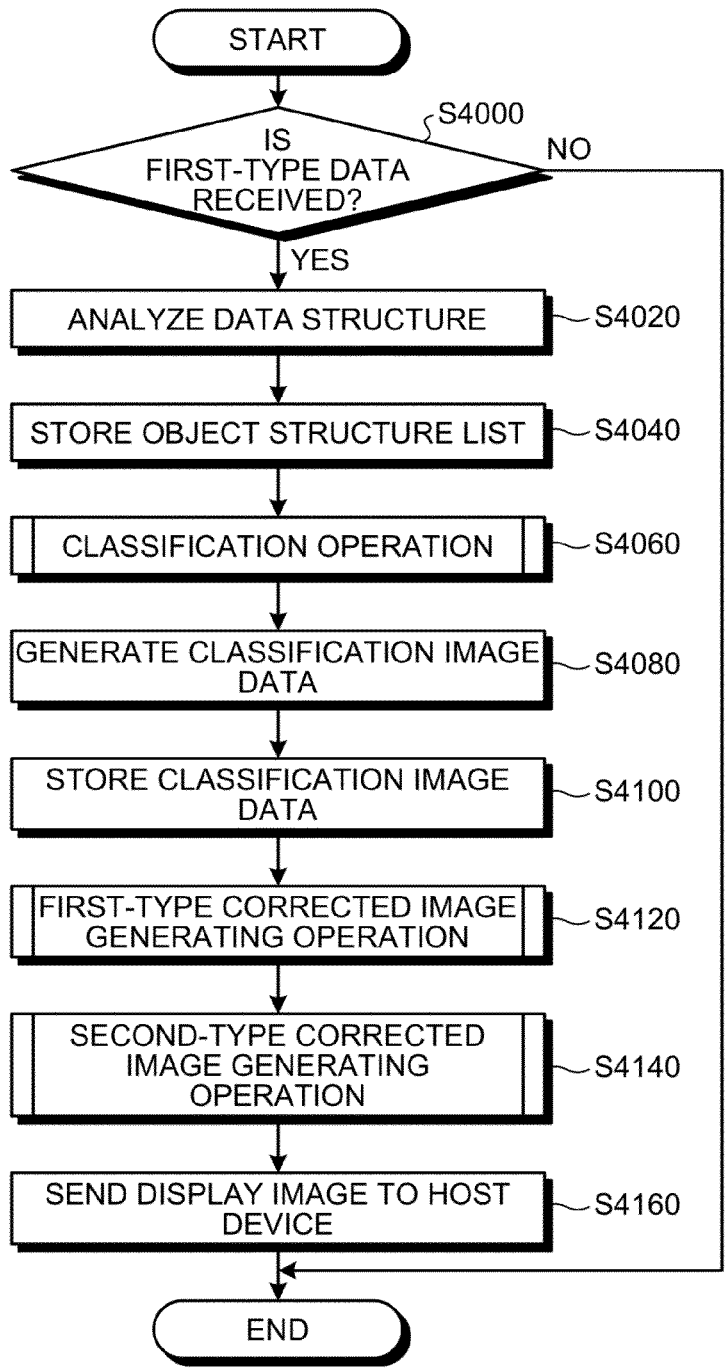
FIG. 33 is a flowchart for explaining a sequence of operations performed during the image processing by the server device according to the second embodiment.

The following explanation is given regarding a sequence of operations performed during the image processing by the server device 3060. FIG. 33 is a flowchart for explaining a sequence of operations performed during the image processing by the server device 3060.

Firstly, the communicating unit 3065 of the server device 3060 determines whether or not the first-type data has been received from the host device 110 (Step S4000). If the first-type data is not yet received (No at Step S4000), then the present routine is terminated.

On the other hand, if the first-type data has been received (Yes at Step S4000), then the system control proceeds to Step S4020.

Then, the analyzing unit 3061 analyzes the data structure of the original data that is included in the first-type data received at Step S4000, and creates an object structure list that contains the objects included in each page of the original data (Step S4020). Subsequently, the analyzing unit 3061 stores the object structure list in the memory unit 3070 (Step S4040).

Then, the classified image data generating unit 3062 performs a classification operation with respect to the original data (Step S4060). This classification operation is identical to the classification operation performed at Step S406 described above.

Subsequently, the classified image data generating unit 3062 generates display image data in the form of the second-type color image data, the second-type gloss control image data, and the second-type clear image data; and stores the display image data in the memory unit 3070 (Step S4080 and Step S4100).

Then, the display image generating unit 3063 performs a first-type corrected image generating operation (Step S4120). The first-type corrected image generating operation performed at Step S4120 is identical to the first-type corrected image generating operation performed at Step S412 described above.

Subsequently, the display image generating unit 3063 performs a second-type corrected image generating operation (Step S4140). The second-type corrected image generating operation performed at Step S4140 is identical to the first-type corrected image generating operation performed at Step S414 described above.

Then, the communicating unit 3065 sends a display image of the display image data (the first-type corrected image data or the second-type corrected image data), which is generated by the display image generating unit 3063, to the host device 110 (Step S4160). Then, the present routine is terminated.

As described above, in the second embodiment, display images are generated in the server device 3060 that is installed on the cloud. Hence, in addition to achieving the effect according to the first embodiment; even if a plurality of host devices 110 is present, it becomes possible to generate composite images in a lump. That makes the task convenient for the administrator.

Meanwhile, in the second embodiment, the single server device 3060 that is installed on the cloud includes the analyzing unit 3061, the classified image data generating unit 3062, and the display image generating unit 3063. However, that is not the only possible case.

For example, the configuration can be such that two or more server devices can be installed on the cloud, and the operations described above can be performed in a distributed manner in those server devices. Moreover, the distribution of operations among the server devices is not limited to any particular manner, but can be performed in an arbitrary manner.

Thus, as long as the host device 110 includes the input unit 99A, the output unit 99C, the display control unit 200J, and the communicating unit 200N as the bare minimum configuration; some or all of the operations can either be performed intensively in a single server device that is installed on the cloud or be performed in a distributed manner among a plurality of server devices that are installed on the cloud.

In other words, as described above, some of the plurality of operations performed in a first device can be performed in one or more of other devices that are connected to that first device via a network.

Meanwhile, consider the case of "some of the plurality of operations performed in a first device can be performed in one or more of other devices that are connected to that first device via a network". In that case, the configuration includes the following operations: an operation performed to output the data (information), which is generated during the operations carried out in that first device, to the other devices; an operation performed by the other devices to receive input of such data; and an operation performed to performed input-output of data either between that first device and the other devices or between the other devices.

That is, when there is a single other device, the configuration includes the data input-output operation performed between the first device and the other device. In contrast, when there are two or more of the other devices, the configuration includes the data input-output operation performed not only between the first device and the other devices but also between two of the other devices.

In the second embodiment, one or more server devices, such as the server device 3060, are installed on the cloud. However, that is not the only possible case. For example, one or more server devices, such as the server device 3060, can be installed on any type of network such as an intranet.

Given below is the explanation regarding a hardware configuration of the host device 11, the host device 110, the DFE 30, and the server device 3060 according to the embodiments.

Figure 34:
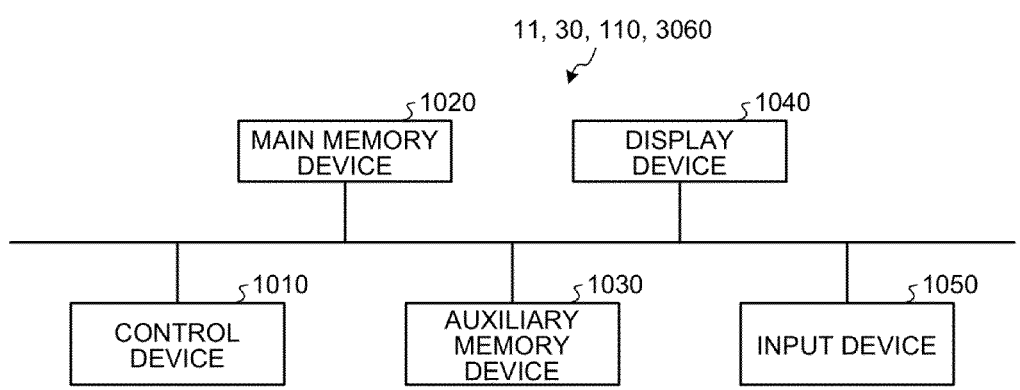
FIG. 34 is a block diagram illustrating an exemplary hardware configuration of the host devices, the DFE, and the server device according to the embodiments.

FIG. 34 is a block diagram illustrating an exemplary hardware configuration of the host device 11, the host device 110, the DFE 30, and the server device 3060 according to the embodiments. Each of the host device 11, the host device 110, the DFE 30, and the server device 3060 according to the embodiments has the hardware configuration of a commonplace computer that includes a control device 1010 such as a CPU, a main memory device 1020 such as a ROM or a RAM, an auxiliary memory device 1030 such as an HDD or a compact disk (CD) drive device, a display device 1040 such as a display, and an input device 1050 such as a keyboard or a mouse.

The computer programs executed in the host device 11, the host device 110, the DFE 30, and the server device 3060 according to the embodiments are recorded in the form of installable or executable files on a computer-readable recording medium such as a compact disk read only memory (CD-ROM), a flexible disk (FD), a compact disk recordable (CD-R), or a digital versatile disk (DVD).

Alternatively, the computer programs executed in the host device 11, the host device 110, the DFE 30, and the server device 3060 according to the embodiments can be saved in a downloadable manner on a computer connected to the Internet. Still alternatively, the computer programs executed in the host device 11, the host device 110, the DFE 30, and the server device 3060 according to the embodiments can be distributed over a network such as the Internet. Still alternatively, the control programs executed in the host device 11, the host device 110, the DFE 30, and the server device 3060 according to the embodiments can be stored in advance, for example, in a ROM.

The computer programs executed in the host device 11, the host device 110, the DFE 30, and the server device 3060 according to the embodiments contain modules for each of the abovementioned constituent elements. In practice, for example, a CPU (processor) reads the computer programs from the memory medium mentioned above and runs them so that the computer programs are loaded in main memory device. As a result, the module for each of the abovementioned constituent elements is generated in the main memory device. Meanwhile, in the embodiments described above, although the host device 11, the host device 110, the DFE 30, and the server device 3060 perform the operations according to the embodiments; that is not the only possible case. Alternatively, any other type of device can perform the operations according to the embodiments. For example, a PC can be used to perform the operations according to the embodiments.

Meanwhile, in the first embodiment described above, the image forming system 100 includes the host device 11, the DFE 30, the MIC 40, and the printing device 60. However, that is not the only possible case. Alternatively, for example, the host device 11, the DFE 30, the MIC 40, and the printing device 60 can be configured in an integrated manner as a single image forming apparatus.

Alternatively, the MIC 40 and the printer 50 can also be configured in an integrated manner.

Moreover, the printing system described in the embodiments includes the MIC 40. However, that is not the only possible case. Alternatively, another device such as the DFE 30 can be equipped to perform the operations and functions of the MIC 40 so that the MIC 40 need not be installed.

Thus, according to an aspect of the present invention, it becomes possible to provide a display processing apparatus, an image forming system, and a computer program product that enable displaying a print preview in which the area formed using a transparent developer is displayed without resulting in hiding of the color image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display processing apparatus comprising:
a first correcting unit that, based on first-type color image data that indicates a color image in each drawing area and first-type gloss control image data that indicates a type of gloss effect to be given to a recording medium and indicates a gloss area to which the gloss effect is to be given in each drawing area, corrects color saturation of an area in the first-type color image data that corresponds to the gloss area specified by the first-type gloss control image data depending on the type of gloss effect so that the area in the first-type color image data differently appears, on a preview image display unit, depending on the type of gloss effect, to thereby generate first-type corrected image data; and
a display control unit that, on the preview image display unit, displays the first-type corrected image data as a print preview of a projected printing result of an original data,
wherein the color saturation is corrected in such a way that when higher gloss level of the type of gloss effect to be given to the area, the color saturation is higher appearing on the preview image display unit.

2. The display processing apparatus according to claim 1, further comprising a generating unit that, based on the original data, generates second-type color image data in which color density values in a color image are defined on a pixel-by-pixel basis and generates second-type gloss control image data in which color density values corresponding to the type of the gloss effect are defined on a pixel-by-pixel basis, wherein
depending on the type of gloss effect to be given to the gloss area, the first correcting unit corrects the color saturation at pixel positions of pixels in the second-type color image data, which are specified as the gloss area by the second-type gloss control image data, to thereby generate the first-type corrected image data.

3. The display processing apparatus according to claim 2, wherein
the original data further contains first-type clear image data that indicates, in each drawing area, a transparent image to be printed using a transparent developer,
based on the first-type clear image data, the generating unit further generates second-type clear image data in which color density values in a transparent image are defined on a pixel-by-pixel basis, and
depending on the color density values in the transparent image, the first correcting unit further corrects the color saturation at pixel positions of pixels in the second-type color image data, which are specified as the drawing area of the transparent image by the second-type clear image data, to thereby generate the first-type corrected image data.

4. The display processing apparatus according to claim 1, further comprising:
a receiving unit that receives input of display information that contains highlighting information in which a type of gloss effect to be highlighted is specified; and
a second correcting unit that corrects the color saturation of pixels in an area in the first-type corrected image data other than a gloss area corresponding to the type of the gloss effect to be highlighted, to thereby generate second-type corrected image data, wherein
the display control unit displays the second-type corrected image data on the preview image display unit.

5. The display processing apparatus according to claim 2, further comprising a memory unit in which color saturation correction values corresponding to types of the gloss effect are stored in advance, wherein
depending on the color saturation correction value corresponding to the type of the gloss effect of the gloss area, the first correcting unit corrects the color saturation at pixel positions of pixels in the second-type color image data, which are specified as the gloss area by the second-type gloss control image data, to thereby generate the first-type corrected image data.

6. The display processing apparatus according to claim 3, further comprising a memory unit in which color saturation correction values corresponding to the color density values in the transparent image are stored, wherein
depending on the color saturation correction values corresponding to the color density values in the transparent image, the first correcting unit further corrects the color saturation at pixel positions of pixels in the second-type color image data, which are specified as the drawing area of the transparent image by the second-type clear image data, to thereby generate the first-type corrected image data.

7. The display processing apparatus according to claim 4, further comprising a memory unit in which color saturation correction values are stored that correspond to types of gloss effect other than the type of the gloss effect to be highlighted, wherein
depending on the color saturation correction value corresponding to a type of gloss effect in an area other than a gloss area corresponding to the type of the gloss effect to be highlighted, the second correcting unit corrects the color saturation of pixels in an area in the first-type corrected image data other than the gloss area corresponding to the type of the gloss effect to be highlighted, to thereby generate the second-type corrected image data.

8. The display processing apparatus according to claim 5, wherein the color saturation correction values stored in the memory unit are modified in response to an instruction issued from an operating unit.

9. The display processing apparatus according to claim 7, wherein the color saturation correction values stored in the memory unit are modified in response to an instruction issued from an operating unit.

10. The display processing apparatus according to claim 2, further comprising an analyzing unit that includes
- a structure analyzing unit that analyzes a structure of the original data by creating an object structure list in which drawing areas in the original data are listed; and
- a classifying unit that classifies the drawing areas listed in the object structure list into a first drawing area group indicating the color image, a second drawing area group indicating the gloss area, and a third drawing area group indicating the transparent image, wherein
- based on an analysis result obtained by the analyzing unit, the generating unit generates the second-type color image data on the basis of image data obtained by integrating drawing areas belonging to the first drawing area group, generates the second-type gloss control image data on the basis of image data obtained by integrating drawing areas belonging to the second drawing area group, and generates the second-type clear image data on the basis of image data obtained by integrating drawing areas belonging to the third drawing area group.

11. The display processing apparatus according to claim 4, further comprising an analyzing unit that includes
- a structure analyzing unit that analyzes a structure of the original data by creating an object structure list in which drawing areas in the original data are listed; and
- a classifying unit that classifies the drawing areas listed in the object structure list into a first drawing area group indicating the color image, a second drawing area group indicating the gloss area, and a third drawing area group indicating the transparent image, wherein
- based on an analysis result obtained by the analyzing unit, the generating unit generates the second-type color image data on the basis of image data obtained by integrating drawing areas belonging to the first drawing area group, generates the second-type gloss control image data on the basis of image data obtained by integrating drawing areas belonging to the second drawing area group, and generates the second-type clear image data on the basis of image data obtained by integrating drawing areas belonging to the third drawing area group.

12. An image forming system comprising:
- a printing unit that prints an image on a recording medium based on original data; and
- a display processing apparatus that, on a preview image display unit, displays a display image as a print preview of a projected printing result of the printing unit, wherein the display processing apparatus includes
  - a first correcting unit that, based on first-type color image data that indicates a color image in each drawing area and first-type gloss control image data that indicates a type of gloss effect to be given to a recording medium and indicates a gloss area to which the gloss effect is to be given in each drawing area, corrects color saturation of an area in the first-type color image data that corresponds to the gloss area indicated by the first-type gloss control image data depending on the type of gloss effect so that the area in the first-type color image data differently appears, on the preview image display unit, depending on the type of gloss effect, to thereby generate first-type corrected image data; and
  - a display control unit that, on the preview image display unit, displays the first-type corrected image data as a print preview of the projected printing result of an original data,
- wherein the color saturation is corrected in such a way that when higher gloss level of the type of gloss effect to be given to the area, the color saturation is higher appearing on the preview image display unit.

13. A computer program product comprising a non-transitory computer-readable medium including programmed instructions, wherein the instructions cause a computer to execute:
- correcting, based on first-type color image data that indicates a color image in each drawing area and first-type gloss control image data that indicates a type of gloss effect to be given to a recording medium and indicates a gloss area to which the gloss effect is to be given in each drawing area, color saturation of an area in the first-type color image data that corresponds to the gloss area indicated by the first-type gloss control image data depending on the type of gloss effect so that the area in the first-type color image data differently appears, on a preview image display unit, depending on the type of gloss effect, to thereby generate first-type corrected image data; and
- displaying, on the preview image display unit, the first-type corrected image data as a print preview of a projected printing result of an original data,
- wherein the color saturation is corrected in such a way that when higher gloss level of the type of gloss effect to be given to the area, the color saturation is higher appearing on the preview image display unit.

* * * * *